(12) United States Patent
Kashima et al.

(10) Patent No.: US 10,807,070 B2
(45) Date of Patent: *Oct. 20, 2020

(54) SILICA TITANIA COMPOSITE AEROGEL PARTICLE, PHOTOCATALYST FORMING COMPOSITION, AND PHOTOCATALYST

(71) Applicant: FUJI XEROX CO., LTD., Tokyo (JP)

(72) Inventors: Yasunobu Kashima, Minamiashigara (JP); Hideaki Yoshikawa, Minamiashigara (JP); Yasuo Kadokura, Minamiashigara (JP); Takeshi Iwanaga, Minamiashigara (JP); Shunsuke Nozaki, Minamiashigara (JP); Sakae Takeuchi, Minamiashigara (JP); Yuka Zenitani, Minamiashigara (JP); Hiroyoshi Okuno, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,495

(22) Filed: May 24, 2018

(65) Prior Publication Data

US 2019/0076822 A1 Mar. 14, 2019

(30) Foreign Application Priority Data

Sep. 12, 2017 (JP) ................ 2017-174867
Sep. 12, 2017 (JP) ................ 2017-174870
Sep. 12, 2017 (JP) ................ 2017-174871

(51) Int. Cl.
*B01J 21/08* (2006.01)
*B01J 35/00* (2006.01)
*B01J 35/10* (2006.01)
*B01J 35/02* (2006.01)

(52) U.S. Cl.
CPC ............ *B01J 21/08* (2013.01); *B01J 35/002* (2013.01); *B01J 35/004* (2013.01); *B01J 35/1019* (2013.01); *B01J 35/1023* (2013.01); *B01J 35/1028* (2013.01); *B01J 35/023* (2013.01)

(58) Field of Classification Search
CPC ...... B01J 21/08; B01J 35/004; B01J 35/1019; B01J 35/1023; B01J 35/1028; B01J 35/023
USPC .......................................... 502/242
See application file for complete search history.

(56) References Cited

U.S. PATENT DOCUMENTS

| | | | |
|---|---|---|---|
| 8,354,358 B2 | 1/2013 | Kayama et al. | |
| 2008/0112880 A1 | 5/2008 | Kayama et al. | |
| 2019/0076808 A1* | 3/2019 | Kadokura | B01J 13/0091 |

FOREIGN PATENT DOCUMENTS

| | | |
|---|---|---|
| JP | 2003-170061 A | 6/2003 |
| JP | 2005-034254 A | 2/2005 |
| JP | 2005-169298 A | 6/2005 |
| JP | 2006-247524 A | 9/2006 |
| JP | 2006-281155 A | 10/2006 |
| JP | 2009-131760 A | 6/2009 |
| JP | 2011-057552 A | 3/2011 |
| JP | 2015-116526 A | 6/2015 |
| JP | 2015-142917 A | 8/2015 |
| JP | 2016-064407 A | 4/2016 |
| JP | 2016-221447 A | 12/2016 |
| JP | 2017-035645 A | 2/2017 |

OTHER PUBLICATIONS

Wang et al., Journal of Porous Materials (Dec. 2014), 21:293-301.*
Feb. 6, 2020 Office Action issued U.S. Appl. No. 15/916,649.

* cited by examiner

*Primary Examiner* — Edward M Johnson
(74) *Attorney, Agent, or Firm* — Oliff PLC

(57) ABSTRACT

Provided is a silica titania composite aerogel particle including a base particle in which an element ratio Si/Ti of silicon to titanium is greater than 0 and equal to or lower than 6. A BET specific surface area of the silica titania composite particle is within a range of 200 m²/g to 1200 m²/g, and the silica titania composite particle has absorption at wavelengths of 450 nm and 750 nm.

18 Claims, 2 Drawing Sheets

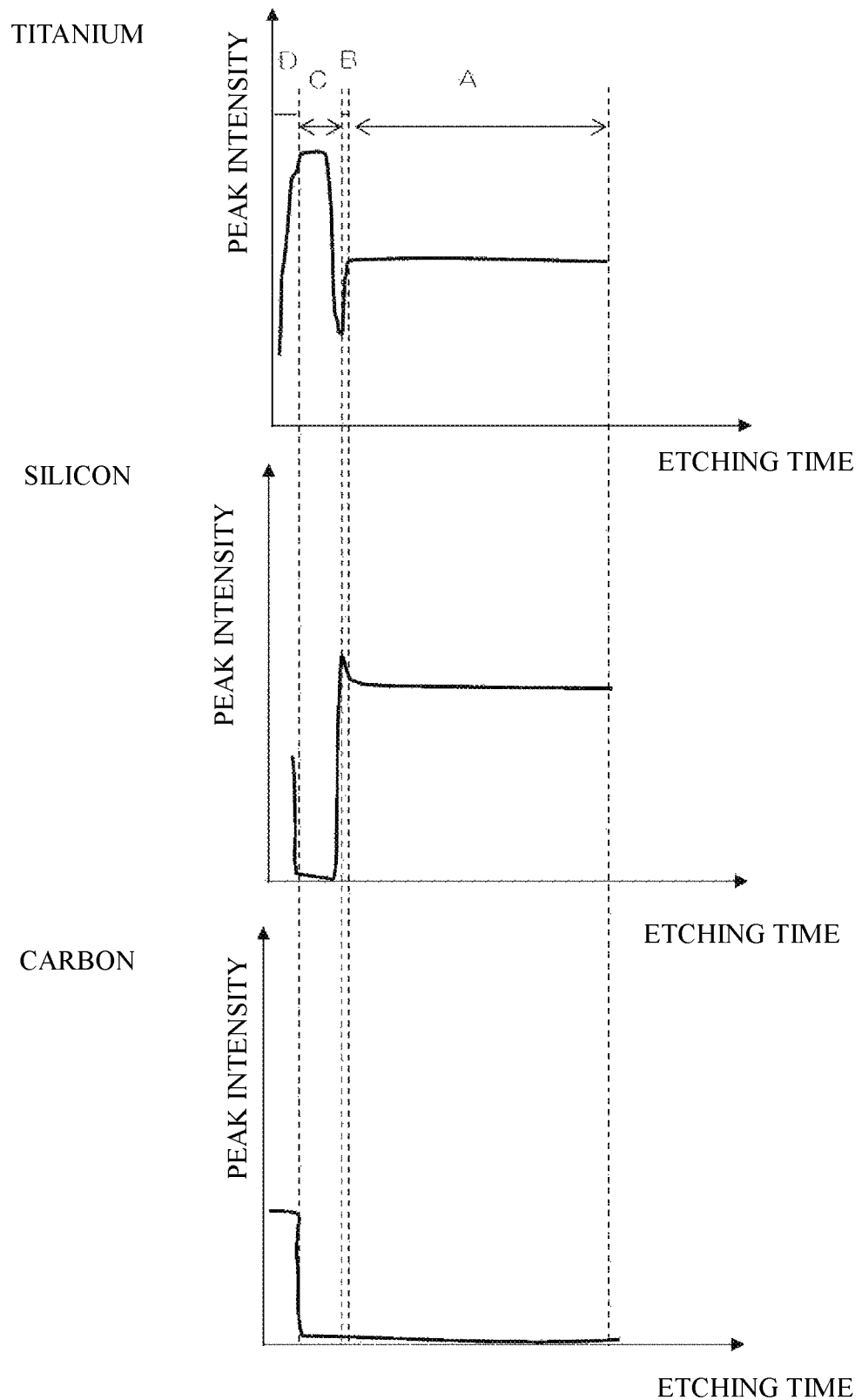

SILICA TITANIA COMPOSITE AEROGEL PARTICLE, PHOTOCATALYST FORMING COMPOSITION, AND PHOTOCATALYST

CROSS-REFERENCE TO RELATED APPLICATIONS

This application is based on and claims priorities under 35 USC 119 from Japanese Patent Application No. 2017-174867 filed on Sep. 12, 2017, Japanese Patent Application No. 2017-174870 filed on Sep. 12, 2017, and Japanese Patent Application No. 2017-184871 filed on Sep. 12, 2017.

BACKGROUND

Technical Field

The present invention relates to a silica titania composite aerogel particle, a photocatalyst forming a composition, and a photocatalyst.

Related Art

A titanium oxide particle commonly used as a photocatalyst material exhibits a photocatalytic function by absorbing ultraviolet light. Therefore, the titanium oxide particle can exhibit the photocatalytic function at daytime on a sunny day where sufficient ultraviolet light can be secured; however the photocatalytic function tends to deteriorate at night or in a shade. For example, when the titanium oxide particle is used as an outer wall material, there may be a difference in anti-pollution performance between sunshine and shade. In addition, when the titanium oxide particle is used for an air purifier or a water purifier, it may be necessary to install a black light or the like as a light source of ultraviolet rays inside the air purifier or the water purifier.

On the other hand, as a technique for increasing the specific surface area exhibiting the photocatalytic function, a photocatalyst material obtained by attaching a photocatalyst particle to a pore surface of a porous material formed of a microporous material such as zeolite and silica gel or a mesoporous material is known.

SUMMARY

According to an aspect of the present invention, there is provided a silica titania composite aerogel particle including a base particle in which an element ratio Si/Ti of silicon to titanium is greater than 0 and equal to or lower than 6, in which a BET specific surface area is within a range of 200 m$^2$/g to 1200 m$^2$/g, and absorption is at wavelengths of 450 nm and 750 nm.

BRIEF DESCRIPTION OF DRAWINGS

Exemplary embodiment(s) of the present invention will be described in detail based on the following figure(s), wherein:

FIG. 2 is an example of an element profile of the silica titania composite aerogel particle according to the exemplary embodiment.

DESCRIPTION OF EMBODIMENTS

Figure 1:
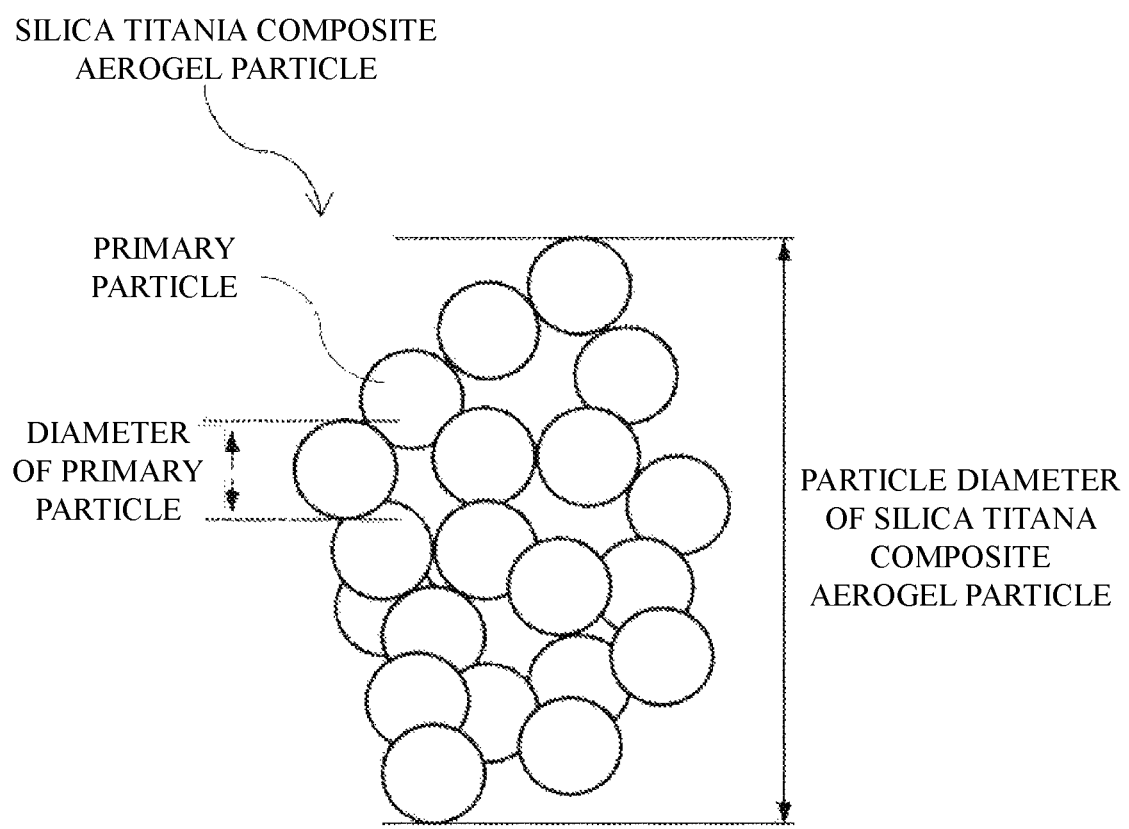
FIG. 1 is a schematic view illustrating a silica titania composite aerogel particle according to the exemplary embodiment.

Hereinafter, exemplary embodiments of the invention will be described. These descriptions and examples are illustrative of exemplary embodiments and are not limited to the scope of the invention.

In the present disclosure, in a case where there are various species of substances corresponding to the components in a composition, unless otherwise specified, the amount of each component in the composition means a total amount of the various species of substances.

In the present disclosure, the term "step" includes not only an independent step, but also includes a step which is not clearly distinguished from other steps as long as the step achieves the intended purpose thereof.

<Silica Titania Composite Aerogel Particle>

According to the exemplary embodiment, the silica titania composite aerogel particle includes a base particle in which an element ratio Si/Ti of silicon to titanium is greater than 0 and equal to or lower than 6, in which a BET specific surface area is in a range of 200 m$^2$/g to 1200 m$^2$/g, and absorption is at wavelengths of 450 nm and 750 nm in a visible absorption spectrum.

The silica titania composite aerogel particle according to the exemplary embodiment may be a base particle as it is, or may be a particle having a surface layer described below on the base particle. In the silica titania composite aerogel particle according to the exemplary embodiment, at least the base particle has an aerogel structure. In the exemplary embodiment, "aerogel" or "aerogel structure" refers to a structure in which the primary particles are aggregated while forming a porous structure, and has a cluster structure with spherical bodies of nanometer order diameter collected. The inside thereof has a three-dimensional mesh-like fine structure FIG. 1 schematically illustrates a structure of an example of a silica titania composite aerogel particle according to the exemplary embodiment. In the silica titania composite aerogel particle illustrated in FIG. 1, the primary particles are aggregated while forming a porous structure to form an aggregated particle (a base particle).

Since the silica titania composite aerogel particle according to the exemplary embodiment has a porous structure including a number of fine pores or voids in the particle, it is inferred that the silica titania composite aerogel particle has a specific surface area (that is, a BET specific surface area of 200 m$^2$/g to 1200 m$^2$/g) which has a comparatively large particle diameter, and has absorption at wavelengths of 450 nm and 750 nm in a visible absorption spectrum as the element ratio Si/Ti is greater than 0 and equal to or lower than 6 in the base particle, that is, the high visible light responsiveness is exhibited. In addition, the silica titania composite aerogel particle according to the exemplary embodiment is supposed not only to have a large specific surface area but also to enhance the photocatalytic function because the capture property of a decomposition object is enhanced by the porous structure.

In the silica titania composite aerogel particle according to the exemplary embodiment, the value of the element ratio Si/Ti of silicon to titanium in the base particle is greater than 0 and equal to or lower than 6. When the value of the element ratio Si/Ti in the base particles is greater than 0, the incorporation of silica into a titania skeleton promotes the porosity of the silica titania aerogel particles, and the adsorbability of photolysis subjects is improved by a large specific surface area, and the photocatalytic function is likely to be exhibited in the visible light region. When the value of the element ratio Si/Ti in the base particle is equal to or less than 6, the photocatalytic effect due to the titania skeleton in the silica titania composite aerogel particle is exhibited, and the photocatalytic function is likely to be exhibited not only in the ultraviolet light region but also in the visible light region.

From the above viewpoint, the element ratio Si/Ti in the base particle is greater than 0 and equal to or less than 6, is more preferably 0.05 to 4, and is still more preferably 0.1 to 3.

The element ratio Si/Ti of silicon to titanium in the base particle is subjected to qualitative analysis (wide scan analysis) of X-ray photoelectron spectroscopy (XPS) so as to prepare and obtain an element profile of the silica titania composite aerogel particle. Detailed measurement methods are as described in [Examples] to be described later.

In the silica titania composite aerogel particle according to the exemplary embodiment, the BET specific surface area is 200 $m^2/g$ to 1200 $m^2/g$. When the BET specific surface area is equal to or greater than 200 $m^2/g$, the surface area is large with respect to the amount, the area capable of adsorbing the photolysis object becomes large, the photocatalytic subject is likely to be adsorbed, and thereby the photocatalytic function is enhanced. When the BET specific surface area is equal to or less than 1200 $m^2/g$, the ratio of coarse particles (particles having a particle diameter of greater than 20 μm) is low, and there by particle dispersibility is improved in a photocatalyst forming a composition, a photocatalyst, or a structure body, which will be described below, and it is likely to exhibit high photocatalytic function. For this reason, when the BET specific surface area of the silica titania composite aerogel particle is within the above range, it is likely to exhibit high photocatalytic function in the visible light region.

From the above viewpoint, the BET specific surface area of the silica titania composite aerogel particle is 200 $m^2/g$ to 1200 $m^2/g$, is preferably 300 $m^2/g$ to 1100 $m^2/g$, and more preferably 400 $m^2/g$ to 1000 $m^2/g$.

The BET specific surface area of the silica titania composite aerogel particle is obtained by using a gas adsorption method using a nitrogen gas. Detailed measurement methods are as described in [Examples] to be described later.

The volume average particle diameter of the silica titania composite aerogel particle according to the exemplary embodiment is preferably 0.1 μm to 3 μm. When the volume average particle diameter is equal to or greater than 0.1 μm, a porous structure is easily formed and the specific surface area becomes large, and there by the adsorptivity of photolysis objects is likely to be improved. With this, it is likely to exhibit a high photocatalyst effect. When the volume average particle diameter is equal to or less than 3 μm, the coarse particles (particles having a particle diameter of larger than 20 μm) are less, and the dispersibility of the silica titania composite aerogel particle in a photocatalyst forming a composition, a photocatalyst, or a structure body which are described below is improved, and thereby the photocatalytic function is improved. For this reason, when the volume average particle diameter of the silica titania composite aerogel particle is within the above range, it is likely to exhibit high photocatalytic function in the visible light region.

From the above viewpoint, the volume average particle diameter of the silica titania composite aerogel particle is preferably 0.1 μm to 3 μm, is more preferably 0.3 μm to 2.8 μm, and is still more preferably 0.4 μm to 2.5 μm.

The particle diameter of the silica titania composite aerogel particle is a particle diameter of the base particle in a case where the silica titania composite aerogel particle is the base particle, and is a particle diameter (aggregated particle diameter) of the aggregated particle in a case where the base particle is an aggregated particle. Also, particle diameter of the silica titania composite aerogel particle is a particle diameter including a surface layer described below in a case where the silica titania composite aerogel particle is a particle including the surface layer on the base particle.

The volume average particle diameter of the silica titania composite aerogel particle is a particle diameter of cumulative 50% from the small diameter side in volume-based particle size distribution.

The volume particle size distribution of the silica titania composite aerogel particle according to the exemplary embodiment may be 1.5 to 10. When the volume particle size distribution is equal to or greater than 1.5, a porous structure is easily formed and the specific surface area becomes large, and there by the adsorptivity of photolysis objects is likely to be improved. With this, it is likely to exhibit a high photocatalyst effect. When the volume particle size distribution is equal to or less than 10, the coarse particles (particles having a particle diameter of larger than 20 μm) are less, and the dispersibility of the silica titania composite aerogel particle in a photocatalyst forming a composition, a photocatalyst, or a structure body which are described below is improved, and thereby the photocatalytic function is improved. For this reason, when the volume particle size distribution of the silica titania composite aerogel particle is within the above range, it is likely to exhibit high photocatalytic function in the visible light region.

From the above viewpoint, the volume particle size distribution of the silica titania composite aerogel particle is preferably 1.5 to 10, is more preferably 1.7 to 5, and is still more preferably 2 to 4.

The volume particle size distribution of the silica titania composite aerogel particle in the exemplary embodiment is defined as $(D90v \div D10v)^{1/2}$. Here, D90v is a particle diameter of cumulative 90% from the small diameter side in volume-based particle size distribution, and D10v is a particle diameter of cumulative 10% from the small diameter side in volume-based particle size distribution.

From the viewpoint of exhibiting high photocatalytic function, in the silica titania composite aerogel particle according to the exemplary embodiment, even in the visible light region, the base particle is an aggregated particle in which the primary particles are aggregated while forming a porous structure, and the average diameter of the primary particles (average primary particle) may be 1 nm to 90 nm. When the average diameter of the primary particles is equal to or greater than 1 nm, a size of a fine pore diameter of the surface of the aggregated particle (base particle) becomes appropriate, the adsorptivity of the photolysis object is improved, and thereby it is likely to exhibit the photocatalytic function in the visible light region. When the average diameter of the primary particles is equal to or smaller than 90 nm, the primary particles are likely to be aggregated while forming a porous structure, and thereby aggregated particle (base particle) is likely to exhibit high photocatalytic function in the visible light region.

From the above viewpoint, the average diameter of the primary particles is preferably 1 nm to 90 nm, is more preferably 5 nm to 80 nm, and is still more preferably 10 nm to 70 nm.

A method of measuring the volume average particle diameter and the volume particle size distribution of the silica titania composite aerogel particle, and the average diameter of the primary particles forming the base particle of the silica titania composite aerogel particle is described [Examples] below.

The silica titania composite aerogel particle according to the exemplary embodiment has absorption at wavelengths of 450 nm and 750 nm in a visible absorption spectrum.

From the viewpoint of exhibiting high photocatalytic function even in the visible light region, the silica titania composite aerogel particle according to the exemplary embodiment may have absorption at wavelengths of 450 nm, 600 nm, and 750 nm in a visible absorption spectrum. The silica titania composite aerogel particle may have absorption at wavelengths in the entire range of 450 nm to 750 nm in the visible absorption spectrum, and preferably has absorption at wavelengths in the entire range of 400 nm to 800 nm in a visible absorption spectrum.

From the viewpoint of exhibiting high photocatalytic function even in the visible light region, the silica titania composite aerogel particle according to the exemplary embodiment, in a UV visible absorption spectrum, when the absorbance at a wavelength of 350 nm is set to be 1, the absorbance at a wavelength of 450 nm is preferably equal to or greater than 0.02 (more preferably equal to or greater than 0.1, and still more preferably equal to or greater than 0.2), the absorbance at a wavelength of 600 nm is preferably equal to or greater than 0.02 (more preferably equal to or greater than 0.1, and still more preferably equal to or greater than 0.2), and the absorbance at a wavelength of 750 nm is preferably equal to or greater 0.02 (more preferably equal to or greater than 0.1, and still more preferably equal to or greater than 0.2).

The UV visible absorption spectrum of the silica titania composite aerogel particle is obtained by measuring the diffuse reflection spectrum in the wavelength range from 200 nm to 900 nm and theoretically obtaining the absorbance at each wavelength by Kubelka-Munk conversion from the diffuse reflection spectrum. Detailed measurement methods are as described in [Examples] to be described later.

According to one aspect, the silica titania composite aerogel particle according to the exemplary embodiment further includes a surface layer which is a layer present on the base particle, and contains a metallic compound which has a metal atom and a hydrocarbon group. The silica titania composite aerogel particle including the surface layer exhibits higher photocatalytic function in the visible light region as compared with the silica titania composite aerogel particle which does not have the surface layer. The surface layer may be covalently bonded to the base particle.

It is confirmed by the following method that the silica titania composite aerogel particle has the surface layer containing a metallic compound which has a metal atom and a hydrocarbon group.

Qualitative analysis (wide scan analysis) of XPS is performed while etching with rare gas ions in the depth direction from the surface of the silica titania composite aerogel particle, and at least titanium, silicon, and carbon are identified and quantified. From the obtained data, for each of at least titanium, silicon, and carbon, an element profile of which a vertical axis represents a peak intensity and a horizontal axis represents an etching time is drawn. A profile curve is divided into plural regions by an inflection point, and a region reflecting an element composition of the base particle, a region reflecting the element composition of the first layer, and a region reflecting the element composition of the second layer are specified. In a case where there is the region reflecting the element composition of the first layer in the element profile, it is determined that the silica titania composite aerogel particle has the first layer. In a case where there is the region reflecting the element composition of the second layer in the element profile, it is determined that the silica titania composite aerogel particle has the second layer.

Hereinafter, explanation will be given by exemplifying FIG. 2.

FIG. 2 is an example of the element profile of a silica titania composite aerogel particle, which is an element profile of titanium, an element profile of silicon, and an element profile of carbon in order from the top.

The element profile as illustrated in FIG. 2 is divided into a region A, a region B, a region C, and a region D by the inflection point of the profile curve.

Region A: A region present at the final stage of etching, the region in which the peak intensity of titanium and the peak intensity of silicon are almost constant.

Region B: A region which is present immediately before the region A, and in which the region closer to the particle surface, the region in which the peak intensity of titanium is small and the peak intensity of silicon is large.

Region C: A region which is present immediately before the region B, and in which the region in which the peak intensity of titanium is almost constant and silicon is hardly detected.

Region D: A region which is present in the final stage of etching, and in which the region in which the peak intensity of carbon is almost constant and the metal element is also detected.

The region A and the region B are regions reflecting the element composition of the base particle. When the base particle is produced, silica and titania form covalent bonds at a ratio corresponding to the mixing ratio of alkoxy silane and titanium alkoxide which are materials of the silica titania composite, thereby forming the base particle. However, on the surface of the base particle, silica is likely to be exhibited as compared with titania. As a result, in the element profile, there are the region A which is present at the final stage of etching, and in which the peak intensity of titanium and the peak intensity of silicon are almost constant, rand the region B which is present immediately before the region A, and in which the region closer to the particle surface, the region in which the peak intensity of titanium is small and the peak intensity of silicon is large.

The region C is a region reflecting the element composition of the first layer. In the case where there is the region C, that is, the region which is present immediately before the region B, and in which the region in which the peak intensity of titanium is almost constant and silicon is hardly detected, it is determined that the silica titania composite aerogel particle includes the first layer which is "the layer formed of titania".

Note that, the region C is the region reflecting the element composition of the first layer; however, it does not necessarily completely match the first layer. The element composition of the base particle may also be reflected on the side close to the region B in the region C.

The region D is a region reflecting the element composition of the second layer (the surface layer). In the case where there is the region D, that is, the region which is present in the final stage of etching, and in which the region in which the peak intensity of carbon is almost constant and the metal element is also detected, it is determined that the silica titania composite aerogel particle includes the second layer (the surface layer) which is "the layer containing the metallic compound which has a metal atom and a hydrocarbon group".

Since examples of candidates of metal atoms constituting the metallic compound in the second layer include silicon, aluminum, and titanium, identification and quantitative determination of aluminum is also performed by XPS if necessary, and an element profile is also drawn for aluminum.

Note that, the region D is the region reflecting the element composition of the second layer (the surface layer); however, it does not necessarily completely match the second layer. The element composition of the first layer may also be reflected on the side close to the region C in the region D.

From the element profile illustrated in FIG. 2, it is determined that the silica titania composite aerogel particle has the base particle, the first layer, and the second layer, the metal atoms constituting the metallic compound in the second layer are silicon.

Hereinafter, a layer configuration of the silica titania composite aerogel particle according to the exemplary embodiment will be further specifically described.

[Base Particle]

The base particle contains a silica titania composite which is a composite oxide of silicon and titanium, and the value of the element ratio Si/Ti of silicon to titanium is greater than 0 and equal to or less than 6.

From the viewpoint of improving the photocatalytic function, the value of the element ratio Si/Ti of silicon to titanium in the base particle is greater than 0 and equal to or less than 6, is more preferably 0.05 to 4, and is still more preferably 0.1 to 3 in the visible light region.

From the viewpoint of exhibiting high photocatalytic function, the BET specific surface area of the base particle is preferably 200 $m^2/g$ to 1200 $m^2/g$, is more preferably 300 $m^2/g$ to 1100 $m^2/g$, and is still more preferably 400 $m^2/g$ to 1000 $m^2/g$.

From the viewpoint of exhibiting high photocatalytic function, the volume average particle diameter of the base particle is preferably 0.1 μm to 3 μm, is more preferably 0.3 μm to 2.8 μm, and is still more preferably 0.4 μm to 2.5 μm.

From the viewpoint of exhibiting high photocatalytic function, the base particle may be an aggregated particle in which the primary particles containing the composite oxide of silicon and titanium are aggregated while forming a porous structure. In this case, the average diameter of the primary particles forming the base particle is preferably 1 nm to 90 nm, is more preferably 5 nm to 80 nm, and is still more preferably 10 nm to 70 nm.

The method of producing the base particle is not particularly limited, a sol-gel method using alkoxy silane and titanium alkoxide may be used as a material from the viewpoint of controlling the range of the BET specific surface area in the above-described range. The base particle produced by the sol-gel method forms an aggregated particle having a porous structure by aggregating the primary particles in the dispersion, and it is possible to exhibit the BET specific surface area to be within the above range.

The base particle may be formed of hydrolysis condensate of alkoxy silane and titanium alkoxide. Here, a portion of a hydrocarbon group of such as an alkoxy group of the alkoxy silane or the titanium alkoxide may remain in the base particle in a state of being unreacted.

The total content of the silica component and the titania component in the base particle is preferably equal to or more than 80% by mass, is more preferably equal to or more than 90% by mass, is still more preferably equal to or more than 95% by mass, based on the total mass of the base particles.

[First Layer]

The first layer may be formed of titania.

From the viewpoint that the visible light responsiveness is more easily exhibited, the first layer may contain titania covalently bonded to the surface of the base particle.

The chemical bond state between atoms in the first layer can be known by performing high resolution analysis (narrow scan analysis) of XPS.

The thickness of the first layer is preferably 0.1 nm to 30 nm, is more preferably 0.2 nm to 10 nm, and is still more preferably 0.3 nm to 5 nm. The thickness of the first layer specifies the region C in the profile curve, and is a value converted from the etching time of the region C.

A method of forming the first layer is not particularly limited, but the first layer may be formed on the surface of the base particle by a sol-gel method using titanium alkoxide as a material. Details of the forming method will be described below.

The first layer may be formed of hydrolysis condensate of titanium alkoxide. Here, a portion of a hydrocarbon group such as an alkoxy group of the titanium alkoxide may remain in the first layer in a state of being unreacted.

The first layer may contain a small amount of metal elements other than titanium such as silicon and aluminum. In a case where the first layer contains silicon, the content of the silicon in which the element ratio Si/Ti of silicon to titanium is 0 to 0.05 does not affect the fact that the silica titania composite aerogel particle exhibits the high photocatalytic function in the visible light region.

[Surface Layer (Second Layer)]

The surface layer (the second layer) is a layer containing a metallic compound which has a metal atom and a hydrocarbon group. In the present disclosure, the metallic compound which has a metal atom and a hydrocarbon group is also referred to as "organometallic compound". From the viewpoint that the organometallic compound is more likely to exhibit the visible light responsiveness, the metallic compound may be formed of only a metal atom, a carbon atom, a hydrogen atom, and an oxygen atom.

From the viewpoint that the visible light responsiveness is more easily exhibited, the surface layer (the second layer) may contain the organometallic compound bonded to the base particle via an oxygen atom. From the viewpoint that the organometallic compound is more likely to exhibit the visible light responsiveness, the organometallic compound is bonded to base particle via an oxygen atom O directly bonded to a metal atom M in the organometallic compound, that is, the organometallic compound may be bonded to the base particle by a covalent bond of M-O—Ti or M-O—Si.

As the organometallic compound contained in the surface layer, an organometallic compound may have a metal atom M and a hydrocarbon group directly bonded to the metal atom M from the viewpoint of more easily exhibiting the visible light responsiveness. The organometallic compound may be bonded to the base particle via an oxygen atom O directly bonded to the metal atom M in the organometallic compound. That is, from the viewpoint of more easily exhibiting the visible light responsiveness, a structure in which a hydrocarbon group, a metal atom M, an oxygen atom O, and a titanium atom Ti or a silicon atom Si may be sequentially covalently bonded (a hydrocarbon group -M-O—Ti or a hydrocarbon group-M-O—Si) on the surface of the silica titania composite aerogel particle aerogel particle.

The chemical bond state between atoms in the surface layer can be known by performing high resolution analysis (narrow scan analysis) of XPS.

As the metal atom constituting the organometallic compound contained in the surface layer, from the viewpoint that the visible light responsiveness is more easily exhibited, silicon, aluminum or titanium is preferable, silicon or aluminum is more preferable, and silicon is particularly preferable.

Examples of the hydrocarbon group contained in the organometallic compound include a saturated or unsaturated aliphatic hydrocarbon group having 1 to 40 carbon atoms (preferably 1 to 20 carbon atoms, more preferably 1 to 18 carbon atoms, still more preferably 4 to 12 carbon atoms, further still more preferably 4 to 10 carbon atoms), and an aromatic hydrocarbon group having 6 to 27 carbon atoms (preferably 6 to 20 carbon atoms, more preferably 6 to 18 carbon atoms, still more preferably 6 to 12 carbon atoms, or further still more preferably 6 to 10 carbon atoms).

The hydrocarbon group contained in the organometallic compound is preferably an aliphatic hydrocarbon group, is more preferably a saturated aliphatic hydrocarbon group, and is particularly an alkyl group, from the viewpoint of exhibiting high photocatalytic function and improvement of dispersibility. The aliphatic hydrocarbon group may be either linear, branched or cyclic, but is preferably linear or branched from the viewpoint of dispersibility. The number of carbon atoms of the aliphatic hydrocarbon group is preferably 1 to 20, is more preferably 1 to 18, is still more preferably 4 to 12, and is further still more preferably 4 to 10.

Examples of the saturated aliphatic hydrocarbon group contained in the organometallic compound include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group), a branched chain alkyl group (such as an isopropyl group, an isobutyl group, an isopentyl group, a neopentyl group, a 2-ethyl hexyl group, a tertiary butyl group, a tertiary pentyl group, and an isopentadecyl group), and a cyclic alkyl group (such as a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group contained in the organometallic compound include an alkenyl group (such as a vinyl group (an ethenyl group), a 1-propenyl group, a 2-propenyl group, a 2-butenyl group, a 1-butenyl group, a 1-hexenyl group, a 2-dodecenyl group, and a pentenyl group), and an alkynyl group (such as an ethynyl group, a 1-propynyl group, a 2-propynyl group, a 1-butynyl group, a 3-hexynyl group, and a 2-dodecynyl group).

The aliphatic hydrocarbon group contained in the organometallic compound includes a substituted aliphatic hydrocarbon group. Examples of the substituent that can be substituted with the aliphatic hydrocarbon group include a halogen atom, an epoxy group, a glycidyl group, a glycidoxy group, a mercapto group, a methacryloyl group, and an acryloyl group.

Examples of the aromatic hydrocarbon group contained in the organometallic compound include a phenylene group, a biphenylene group, a terphenylene group, a naphthalene group, and an anthracene group.

The aromatic hydrocarbon group contained in the organometallic compound includes a substituted aromatic hydrocarbon group. Examples of the substituent that can be substituted with the aromatic hydrocarbon group include a halogen atom, an epoxy group, a glycidyl group, a glycidoxy group, a mercapto group, a methacryloyl group, and an acryloyl group.

The organometallic compound contained in the surface layer is derived, for example, from the organometallic compound used in the surface treatment step described later.

The silica titania composite aerogel particle including the surface layer exhibits high photocatalytic function even in the visible light region, and is advantageous from the viewpoints described below.

Generally, the silica titania composite aerogel particle has poor dispersibility in the resin or the solvent, and thus it is likely that the uniformity of the coating film is low and the photocatalytic function cannot be exerted.

In contrast, the silica titania composite aerogel particle having a surface layer has a hydrocarbon group derived from the organometallic compound on the surface, and thus has excellent dispersibility in the resin or the solvent. As a result, it is possible to form a uniform coating film, and thereby light is efficiently applied to the silica titania composite aerogel particle, and the photocatalytic function is likely to be exerted. In addition, aggregation and coating defects of the silica titania composite aerogel particle are suppressed when a coating material containing the silica titania composite aerogel particle is applied to the surface of, for example, an outer wall material, a plate, a pipe, and a nonwoven fabric, and thereby the photocatalytic function tends to be exhibited for a long time period.

The thickness of the surface layer is preferably 0.1 nm to 30 nm, is more preferably 0.2 nm to 10 nm, and is still more preferably 0.3 nm to 5 nm. The thickness of the surface layer specifies the region D in the profile curve, and is a value converted from the etching time of the region D.

<Method of Producing Silica Titania Composite Aerogel Particle>

The method of producing the silica titania composite aerogel particle according to the exemplary embodiment is not particularly limited. For example, a porous particle containing the silica titania composite is obtained by the sol-gel method, and the porous particle may be set as the silica titania composite aerogel particle according to the exemplary embodiment. In this case, the porous particles granulated by the sol-gel method may be heat-treated after the surface treatment, and the porous particles after the heat treatment are set as the silica titania composite aerogel particle according to the exemplary embodiment.

The silica titania composite aerogel particle including the surface layer is obtained by surface treating the porous particles granulated by, for example, the sol-gel method with the organometallic compound. In this case, the porous particles may be heat-treated after the surface treatment, and the porous particles after the heat treatment are set as the silica titania composite aerogel particle according to the exemplary embodiment.

Hereinafter, an example of a method of producing the silica titania composite aerogel particle according to the exemplary embodiment will be described, separately for the case where the silica titania composite aerogel particle which does not include the surface layer and the case where the silica titania composite aerogel particle includes the surface layer.

—Method of Producing Silica Titania Composite Aerogel Particle Which Does Not Include Surface Layer—

The present producing method may contain at least the followings (1), (2), and (3) (1) A step of granulating porous particles containing a silica titania composite by a sol-gel method so as to prepare a dispersion containing the porous particles and a solvent (dispersion preparation step)

(2) A step of removing the solvent from the dispersion using supercritical carbon dioxide (solvent removal step)
(3) A step of heat-treating the porous particles after removing the solvent (heat treatment step).

[(1) Dispersion Preparation Step]

The dispersion preparation step is a step of generating a silica titania composite by causing a reaction of the alkoxy silane and the titanium alkoxide (hydrolysis and condensation) by using the alkoxy silane and the titanium alkoxide as materials so as to obtain a dispersion in which porous particles containing the silica titania composite are dispersed in a solvent. Here, the porous particle may be an aggregated particle in which the primary particles containing the silica titania composite are aggregated while forming a porous structure.

Specifically, the dispersion preparation step is, for example, the following step.

An alkoxy silane and a titanium alkoxide are added to alcohol, an acid aqueous solution is dropped thereinto under stirring, and the alkoxy silane and the titanium alkoxide are reacted to generate the silica titania composite so as to obtain a dispersion in which porous particles containing the silica titania composite are dispersed in alcohol (porous particle dispersion).

When the mixing ratio of the alkoxy silane and the titanium alkoxide in the dispersion preparation step, it is possible to control the element ratio Si/Ti of silicon to titanium in the base particle.

It is possible to control the particle diameter of the primary particle constituting the base particle and the particle diameter of the base particle by the total amount of the alkoxy silane and the titanium alkoxide with respect to the amount of alcohol in the dispersion preparation step, and as the total amount with respect to the amount of alcohol is large, the particle diameter of the primary particle constituting the base particle becomes smaller, and the particle diameter of the base particle becomes larger. The total amount of the alkoxy silane and the titanium alkoxide is preferably 4 parts by mass to 250 parts by mass, and is more preferably 10 parts by mass to 50 parts by mass, with respect to 100 parts by mass of alcohol.

Examples of the alkoxy silane used in the dispersion preparation step include tetraalkoxy silane such as tetramethoxy silane, tetraethoxy silane, tetrapropoxy silane, and tetrabutoxy silane; alkyl trialkoxy silanes such as methyl trimethoxy silane, methyl triethoxy silane, and ethyl triethoxy silane; and alkyl dialkoxy silane such as dimethyl dimethoxy silane and dimethyl diethoxy silane. These may be used alone or two or more species thereof may be used in combination.

Examples of the titanium alkoxide used in the dispersion preparation step include tetraalkoxy titanium such as tetramethoxy titanium, tetraethoxy titanium, tetrapropoxy titanium, and tetrabutoxy titanium, and alkoxy titanium chelate obtained by chelating a portion of an alkoxy group such as di-i-propoxy bis(ethyl acetylacetonate) titanium and di-i-propoxy bis(acetylacetonate) titanium. These may be used alone or two or more species thereof may be used in combination.

Examples of the alcohol used in the dispersion preparation step include methanol, ethanol, propanol, and butanol. These may be used alone or two or more species thereof may be used in combination.

Examples of the acid of the acid aqueous solution used in the dispersion preparation step include oxalic acid, acetic acid, hydrochloric acid, and nitric acid. An acid concentration of the acid aqueous solution is preferably 0.001% by mass to 1% by mass, and is more preferably 0.005% by mass to 0.01% by mass.

A drop amount of the acid aqueous solution in the dispersion preparation step is preferably 0.001 parts by mass to 0.1 parts by mass, with respect to 100 parts by mass of total amount of the alkoxy silane and the titanium alkoxide.

The porous particle dispersion obtained in the dispersion preparation step has a solid concentration which may be 1% by mass to 30% by mass.

[(2) Solvent Removal Step]

The solvent removal step is a step of removing a solvent by bringing supercritical carbon dioxide into contact with a dispersion containing a porous particle and the solvent. A solvent removal treatment with supercritical carbon dioxide is less prone to collapse or blockage of pores of porous particles (particularly, an aggregated particle in which the primary particles are aggregated while forming a porous structure) as compared with a solvent removal treatment by heating. Since the solvent removal step is a step of removing the solvent with supercritical carbon dioxide, the silica titania composite aerogel particle having a BET specific surface area of 200 $m^2/g$ or more can be obtained.

Specifically, the solvent removal step is performed, for example, by the following operation.

The porous particle dispersion is introduced into a sealed reactor, subsequently liquefied carbon dioxide is introduced, and then the sealed reactor is heated and the inside thereof is pressurized with a high-pressure pump so as to convert carbon dioxide in the sealed reactor into a supercritical state. In addition, the liquefied carbon dioxide is caused to flow into the sealed reactor, the supercritical carbon dioxide is caused to flow out from the sealed reactor, and thereby the supercritical carbon dioxide is caused to flow through the porous particle dispersion in the sealed reactor. While the supercritical carbon dioxide flows though the porous particle dispersion, the solvent is dissolved into the supercritical carbon dioxide, and the solvent is removed accompanying supercritical carbon dioxide flowing out of the sealed reactor.

The temperature and pressure in the sealed reactor are a temperature and a pressure at which carbon dioxide is in a supercritical state. For example, when the critical point of carbon dioxide is 31.1° C./7.38 MPa, the temperature is set to be 50° C. to 200° C. and the pressure is 10 MPa to 30 MPa.

[(3) Heat Treatment Step]

With the heat treatment step, the photocatalytic function in the visible light of the silica titania composite aerogel particle is further improved. Although the detailed mechanism is unknown, it is inferred that a portion of an alkoxy group, a portion of an alkyl group, or a portion of a chelated alkoxy group of the alkoxy silane or the titanium alkoxide in which the particles are formed in the dispersion preparation step remains on the particle surface, and at least a portion of these hydrocarbon groups is oxidized or carbonized by the heat treatment, thereby increasing the visible light responsiveness of the silica titania composite aerogel particle.

The temperature of the heating treatment is preferably 180° C. to 500° C., is more preferably 200° C. to 450° C., and is still more preferably 250° C. to 400° C., from the viewpoint of improving the photocatalytic function. The time of the heating treatment is preferably 10 minutes to 24 hours, is more preferably 20 minutes to 300 minutes, and is still more preferably 30 minutes to 120 minutes, from the viewpoint of improving the photocatalytic function The method of the heat treatment is not particularly limited, and examples thereof include a heating method with an electric furnace, a sintering furnace (roller hearth kiln, shuttle kiln, and the like), a radiant heating oven, a hot plate or the like; and a heating method with laser light, infrared rays, UV, and microwave.

Through the above steps, the method of producing the silica titania composite aerogel particle which does not include surface layer is obtained.

In order to provide the first layer on the surface of the base particle, the dispersion preparation step is performed, for example, in the following two steps. (i) An alkoxy silane and a titanium alkoxide are added to alcohol, an acid aqueous solution is dropped thereinto under stirring, and the alkoxy silane and the titanium alkoxide are reacted to generate the silica titania composite so as to obtain a dispersion in which base particles containing the silica titania composite are dispersed in alcohol (first dispersion). Here, the base particle may be an aggregated particle in which the primary particles containing the silica titania composite are aggregated while forming a porous structure. (ii) A mixed solution obtained by mixing a titanium alkoxide with alcohol under stirring is added dropwise to the first dispersion, and the base particle and titanium alkoxide are reacted to form a first layer on the surface of the base particle so as to obtain a dispersion (a second dispersion) in which the porous particles are dispersed in alcohol.

When the mixing ratio of the alkoxy silane and the titanium alkoxide in the (i), it is possible to control the element ratio Si/Ti of silicon to titanium in the base particle.

It is possible to control the particle diameter of the primary particle constituting the base particle and the particle diameter of the base particle by the total amount of the alkoxy silane and the titanium alkoxide with respect to the amount of alcohol in the above (i), and as the total amount with respect to the amount of alcohol is large, the particle diameter of the primary particle constituting the base particle becomes smaller, and the particle diameter of the base particle becomes larger. The total amount of the alkoxy silane and the titanium alkoxide is preferably 4 parts by mass to 250 parts by mass, and is more preferably 10 parts by mass to 50 parts by mass, with respect to 100 parts by mass of alcohol.

Examples of the titanium alkoxide used in the above (i) and (ii) include tetraalkoxy titanium such as tetramethoxy titanium, tetraethoxy titanium, tetrapropoxy titanium, and tetrabutoxy titanium, and alkoxy titanium chelate obtained by chelating a portion of an alkoxy group such as di-i-propoxy bis(ethyl acetylacetonate) titanium and di-i-propoxy bis(acetylacetonate) titanium. These may be used alone or two or more species thereof may be used in combination. The titanium alkoxide used in the above (i) and the titanium alkoxide used in the above (ii) may be the same as or different from each other.

Examples of the alcohol used in the above (i) and (ii) include methanol, ethanol, propanol, and butanol. These may be used alone or two or more species thereof may be used in combination. The alcohol used in the above (i) and the alcohol used in the above (ii) may be the same as or different from each other.

The first dispersion obtained in the above (i) has a solid concentration which may be 1% by mass to 30% by mass.

The second dispersion obtained in the above (i) has a solid concentration which may be 1% by mass to 30% by mass.

—Method of Producing Silica Titania Composite Aerogel Particle Including Surface Layer—

The present producing method may contain at least the followings (1'), (2') and (3'), and (4')

(1') A step of granulating porous particles containing a silica titania composite by a sol-gel method so as to prepare a dispersion containing the porous particles and a solvent (dispersion preparation step).

(2') A step of removing the solvent from the dispersion using supercritical carbon dioxide (solvent removal step).

(3') A step of surface-treating the porous particles after removing the solvent with a metallic compound having a metal atom and a hydrocarbon group (surface treatment step). The step of surface-treating the porous particles after removing the solvent with a metallic compound having a metal atom and a hydrocarbon group may be performed in the supercritical carbon dioxide.

(4') A step of heat-treating the porous particles after the surface treatment (heat treatment step).

The above (1') and (2') are the same as the above (1) and (2) in the method of producing the silica titania composite aerogel particle which does not include the surface layer.

[(3') Surface Treatment Step]

A surface treatment step is a step of reacting a metallic compound having a metal atom and a hydrocarbon group (in the present disclosure, referred to as an "organometallic compound") with the surface of the porous particle. In the surface treatment step, a reactive group (for example, a hydrolyzable group such as a halogeno group or an alkoxy group) in the organometallic compound reacts with a reactive group (for example, a hydroxyl group) present on the surface of the porous particle so as to perform the surface treatment of the porous particles. The surface treatment step can be performed in the air or under a nitrogen atmosphere. When the surface treatment step is performed in the supercritical carbon dioxide, the organometallic compound reaches deep into the fine pores of the porous particles and surface treatment is performed deep into the fine pores of porous particles, and therefore, the surface treatment may be performed in the supercritical carbon dioxide.

The surface treatment step is performed by, for example, mixing and reacting the organometallic compound with the porous particle in the supercritical carbon dioxide under stirring. In addition, the surface treatment step is performed by, for example, preparing a treatment liquid obtained by mixing the organometallic compound and the solvent, and then mixing the porous particle and the treatment liquid in the supercritical carbon dioxide under stirring. In order to maintain the fine pore structure of the porous particle and to obtain a high specific surface area, a method in which the organometallic compound may be subsequently introduced into the supercritical carbon dioxide after completion of the step of (2) and the organometallic compound reacts with the surface of the porous particle in the supercritical carbon dioxide.

The temperature and pressure in the surface treatment step are a temperature and a pressure at which carbon dioxide is in a supercritical state. For example, the surface treatment step is performed in an atmosphere of a temperature of 50° C. to 200° C., and a pressure of 10 MPa to 30 MPa. The reaction time is preferably 10 minutes to 24 hours, is more preferably 20 minutes to 120 minutes, and is even more preferably 30 minutes to 90 minutes.

As the organometallic compound used in the surface treatment, an organometallic compound having a metal atom and a hydrocarbon group may be directly bonded to the metal atom. In a case where the organometallic compound has hydrocarbon groups, at least one hydrocarbon group may be directly bonded to the metal atom in the organometallic compound.

As the metal atom of the organometallic compound, silicon, aluminum or titanium is preferable, silicon or aluminum is more preferable, and silicon is particularly preferable.

Examples of the hydrocarbon group contained in the organometallic compound include a saturated or unsaturated aliphatic hydrocarbon group having 1 to 40 carbon atoms (preferably 1 to 20 carbon atoms, more preferably 1 to 18 carbon atoms, still more preferably 4 to 12 carbon atoms, further still more preferably 4 to 10 carbon atoms), and an aromatic hydrocarbon group having 6 to 27 carbon atoms (preferably 6 to 20 carbon atoms, more preferably 6 to 18 carbon atoms, still more preferably 6 to 12 carbon atoms, or further still more preferably 6 to 10 carbon atoms).

The hydrocarbon group contained in the organometallic compound is preferably an aliphatic hydrocarbon group, is more preferably a saturated aliphatic hydrocarbon group, and is particularly an alkyl group, from the viewpoint of exhibiting high photocatalytic function and improvement of dispersibility. The aliphatic hydrocarbon group may be either linear, branched or cyclic, but is preferably linear or branched from the viewpoint of dispersibility. The number of carbon atoms of the aliphatic hydrocarbon group is preferably 1 to 20, is more preferably 1 to 18, is still more preferably 4 to 12, and is further still more preferably 4 to 10.

As the organometallic compound, a silane compound having a hydrocarbon group may be used. Examples of the silane compound contained in the hydrocarbon group include a chlorosilane compound, an alkoxy silane compound, a silazane compound (hexamethyl disilazane or the like).

As the silane compound having a hydrocarbon group used in the surface treatment, a compound represented by Formula (1): $R^1{}_n SiR^2{}_m$ may be used from the viewpoint of exhibiting high photocatalytic function and improving the dispersibility.

In Formula (1): $R^1{}_n SiR^2{}_m$, $R^1$ represents a saturated or unsaturated aliphatic hydrocarbon group having 1 to 20 carbon atoms or an aromatic hydrocarbon group having 6 to 20 carbon atoms, $R^2$ represents a halogen atom or an alkoxy group, n represents an integer of 1 to 3, and m represents an integer of 1 to 3. Here, n+m=4. When n is an integer of 2 or 3, the plural $R^1$ may be the same groups or different groups. When m is an integer of 2 or 3, the plural $R^2$ may be the same groups or different groups.

The aliphatic hydrocarbon group represented by $R^1$ may be either linear, branched or cyclic, but is preferably linear or branched from the viewpoint of dispersibility. From the viewpoint of exhibiting high photocatalytic function and improvement of dispersibility, the number of carbon atoms of the aliphatic hydrocarbon group is preferably 1 to 20, is more preferably 1 to 18, is still more preferably 4 to 12, and is further still more preferably 4 to 10. The aliphatic hydrocarbon group may be either saturated or unsaturated; however, from the viewpoint of exhibiting high photocatalytic function and improvement of dispersibility, a saturated aliphatic hydrocarbon group is preferable, and an alkyl group is more preferable.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group), a branched chain alkyl group (such as an isopropyl group, an isobutyl group, an isopentyl group, a neopentyl group, a 2-ethyl hexyl group, a tertiary butyl group, a tertiary pentyl group, and an isopentadecyl group), and a cyclic alkyl group (such as a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group include an alkenyl group (such as a vinyl group (an ethenyl group), a 1-propenyl group, a 2-propenyl group, a 2-butenyl group, a 1-butenyl group, a 1-hexenyl group, a 2-dodecenyl group, and a pentenyl group), and an alkynyl group (such as an ethynyl group, a 1-propynyl group, a 2-propynyl group, a 1-butynyl group, a 3-hexynyl group, and a 2-dodecynyl group).

The aliphatic hydrocarbon group also includes a substituted aliphatic hydrocarbon group. Examples of the substituent that can be substituted with the aliphatic hydrocarbon group include a halogen atom, an epoxy group, a glycidyl group, a glycidoxy group, a mercapto group, a methacryloyl group, and an acryloyl group.

The aromatic hydrocarbon group represented by $R^1$ preferably has 6 to 20 carbon atoms, more preferably 6 to 18 carbon atoms, still more preferably 6 to 12 carbon atoms, and particularly preferably 6 to 10 carbon atoms.

Examples of the aromatic hydrocarbon group include a phenylene group, a biphenylene group, a terphenylene group, a naphthalene group, and an anthracene group.

The aromatic hydrocarbon group also includes a substituted aromatic hydrocarbon group. Examples of the substituent that can be substituted with the aromatic hydrocarbon group include a halogen atom, an epoxy group, a glycidyl group, a glycidoxy group, a mercapto group, a methacryloyl group, and an acryloyl group.

Examples of the halogen atom represented by $R^2$ include a fluorine atom, a chlorine atom, a bromine atom, and an iodine atom. The halogen atom may be a chlorine atom, a bromine atom, or an iodine atom.

Examples of the alkoxy group represented by $R^2$ include an alkoxy group having 1 to 10 carbon atoms (preferably 1 to 8 carbon atoms, and more preferably 3 to 8 carbon atoms). Examples of the alkoxy group include a methoxy group, an ethoxy group, an isopropoxy group, a t-butoxy group, a n-butoxy group, a n-hexyloxy group, a 2-ethyl hexyloxy group, and a 3,5,5-trimethyl hexyloxy group. The alkoxy group includes substituted alkoxy group. Examples of the substituent that can be substituted with the alkoxy group include a halogen atom, a hydroxyl group, an amino group, an alkoxy group, an amide group, and a carbonyl group.

From the viewpoint of exhibiting high photocatalytic function and improvement of dispersibility, the compound represented by Formula (1): $R^1{}_n SiR^2{}_m$ may be a compound in which $R^1$ is a saturated aliphatic hydrocarbon group. Particularly, in the compound represented by Formula (1): $R^1{}_n SiR^2{}_m$, $R^1$ may be a saturated aliphatic hydrocarbon group having 1 to 20 carbon atoms, $R^2$ may be a halogen atom or an alkoxy group, n may be an integer of 1 to 3, and m may be an integer of 1 to 3, and n and m satisfy an expression of n+m=4.

Examples of the compound represented by Formula (1): $R^1{}_n SiR^2{}_m$ include silane compounds such as vinyl trimethoxy silane, methyl trimethoxy silane, ethyl trimethoxy silane, propyl trimethoxy silane, butyl trimethoxy silane, hexyl trimethoxy silane, n-octyl trimethoxy silane, decyl trimethoxy silane, dodecyl trimethoxy silane, vinyl triethoxy silane, methyl triethoxy silane, ethyl triethoxy silane, butyl triethoxy silane, hexyl triethoxy silane, decyl triethoxy silane, dodecyl triethoxy silane, phenyl trimethoxy silane, o-methyl phenyl trimethoxy silane, p-methyl phenyl trimethoxy silane, phenyl triethoxy silane, benzyl triethoxy silane, decyl trichlorosilane, and phenyl trichlorosilane (above, n=1, m=3); dimethyl dimethoxy silane, dimethyl diethoxy silane, methyl vinyl dimethoxy silane, methyl vinyl diethoxy silane, diphenyl dimethoxy silane, diphenyl di ethoxy silane, dimethyl dichlorosilane, and dichlorodiphenyl silane (above, n=2, m=2); trimethyl methoxy silane, trimethyl ethoxy silane, trimethyl chlorosilane, decyl dimethyl chlorosilane, and triphenyl chlorosilane (above, n=3, m=1); 3-glycidoxy propyl trimethoxy silane, γ-methacryloxy propyl trimethoxy silane, γ-mercaptopropyl trimethoxy silane, γ-chloropropyl trimethoxy silane, γ-aminopropyl trimethoxy silane, γ-aminopropyl triethoxy silane, γ-(2-aminoethyl) aminopropyl trimethoxy silane, γ-(2-aminoethyl) aminopropyl methyl dimethoxy silane, and γ-glycidyloxy propyl methyl dimethoxy silane (above, compounds in which $R^1$ is a substituted aliphatic hydrocarbon group or a substituted aromatic hydrocarbon group).

The silane compound may be used alone or two or more species thereof may be used in combination.

The hydrocarbon group in the silane compound represented by Formula (1) is preferably an aliphatic hydrocarbon group, is more preferably a saturated aliphatic hydrocarbon group, and is particularly preferably an alkyl group, from the viewpoint of exhibiting high photocatalytic function and improvement of dispersibility. The hydrocarbon group in the silane compound is preferably a saturated aliphatic hydrocarbon group having 1 to 20 carbon atoms, is more preferably a saturated aliphatic hydrocarbon group having 1 to 18 carbon atoms, is still more preferably a saturated aliphatic hydrocarbon group having 4 to 12 carbon atoms, and is particularly preferably a saturated aliphatic hydrocarbon group having 4 to 10 carbon atoms, from the viewpoint of exhibiting high photocatalytic function and improvement of dispersibility.

Examples of the compound in which the metal atom of the organometallic compound is aluminum include aluminum chelate such as di-i-propoxy aluminum ethylacetoacetate; and an aluminate-based coupling agent such as acetoalkoxy aluminum diisopropylate.

Examples of the compound in which the metal atom of the organometallic compound is titanium include a titanate-based coupling agent such as isopropyl triisostearoyl titanate, tetraoctyl bis(ditridecyl phosphite) titanate, and bis(dioctyl pyrophosphate) oxyacetate titanate; and titanium chelate such as di-i-propoxybis(ethylacetoacetate) titanium, di-i-propoxybis(acetylacetonato) titanium, di-i-propoxybis(triethanolaminate) titanium, di-i-propoxytitanium diacetate, di-i-propoxy titanium dipropionate.

The organometallic compound may be used alone or two or more species thereof may be used in combination.

In the case of using a treatment liquid prepared by mixing an organometallic compound and a solvent, the solvent used for preparing the treatment liquid is not particularly limited as long as it is a chemical substance compatible with the organometallic compound. The solvent used for preparing the treatment liquid may be alcohols such as methanol, ethanol, propanol, and butanol, and organic solvents such as toluene, ethyl acetate, and acetone.

In the treatment liquid, the amount of the organometallic compound is preferably 10 parts by mass to 200 parts by mass, is more preferably 20 parts by mass to 180 parts by mass, and is even more preferably 50 parts by mass to 150 parts by mass, with respect to 100 parts by mass of the solvent.

The amount of the organometallic compound used in the surface treatment is preferably 10 parts by mass to 200 parts by mass, is more preferably 20 parts by mass to 180 parts by mass, and is even more preferably 30 parts by mass to 150 parts by mass, with respect to 100 parts by mass of the porous particles. When the amount of the organometallic compounds is set to be equal to or greater than 10 parts by mass, a high photocatalytic function is easily exhibited even in the visible light region, and the dispersibility is also increased. When the amount of the organometallic compound is set to be equal to or less than 200 parts by mass, present on the surface of the porous particle, excessive amount of carbon derived from the organometallic compound, present on the surface of the porous particle, is suppressed and deterioration of the photocatalytic function due to excess carbon is suppressed.

After the surface treatment, a drying treatment for the purpose of removing excess organometallic compounds and residues such as the solvent of the treatment liquid may be performed. As the drying treatment, known methods such as a spray drying method and a shelf drying method can be used, but a step of removing the solvent from the dispersion containing the porous particles using the supercritical carbon dioxide is preferable, and a step of removing the solvent in supercritical carbon dioxide subsequently after the completion of the surface treatment step of (3') by causing the supercritical carbon dioxide to flow is more preferable. The specific operation may be the same as the operation described in the above (2).

[(4') Heat Treatment Step]

With the heat treatment step, the photocatalytic function in the visible light of the silica titania composite aerogel particle is further improved. Although the detailed mechanism is unknown, it is considered that when a portion of the hydrocarbon group contained in the surface layer is oxidized or carbonized by heat treatment, the photocatalytic function is exhibited by absorbing visible light and acting as a photocharge separation function even by light absorption of visible light together with UV light. This indicates that the silica titania composite aerogel particle has absorption at wavelengths of 450 nm and 750 nm in a visible absorption spectrum. That is, an action of selectively capturing electrons by light absorption of the visible light together with the UV light works by a portion of oxidized or carbonized hydrocarbon or carbonized carbon present on the surface of the silica titania composite aerogel particle. As a result, it is inferred that the probability of recombination of electrons and holes generated by light absorption is lowered, the charge separation is efficiently promoted, and thereby the visible light responsiveness of the silica titania composite aerogel particle is enhanced by promoting this charge separation.

The temperature of the heating treatment is preferably 180° C. to 500° C., is more preferably 200° C. to 450° C., and is still more preferably 250° C. to 400° C., from the viewpoint of improving the photocatalytic function. The time of the heating treatment is preferably 10 minutes to 24 hours, is more preferably 20 minutes to 300 minutes, and is still more preferably 30 minutes to 120 minutes, from the viewpoint of improving the photocatalytic function.

The method of the heat treatment is not particularly limited, and examples thereof include a heating method with an electric furnace, a sintering furnace (roller hearth kiln, shuttle kiln, and the like), a radiant heating oven, a hot plate or the like; and a heating method with laser light, infrared rays, UV, and microwave.

Through the above steps, the method of producing the silica titania composite aerogel particle which does not include surface layer is obtained.

<Photocatalyst Forming a Composition>

The photocatalyst forming a composition according to the exemplary embodiment includes the silica titania composite aerogel particle according to the exemplary embodiment, and at least one compound selected from the group consisting of a dispersion medium and a binder.

Examples of the photocatalyst forming a composition according to the exemplary embodiment include the silica titania composite aerogel particle according to the exemplary embodiment, and a dispersion containing a dispersion medium; the silica titania composite aerogel particle according to the exemplary embodiment and a composition containing an organic or inorganic binder. The dispersion may be in the form of a paste having a high viscosity.

As the dispersion medium, water, an organic solvent, and the like may be used. Examples of water include tap water, distilled water, and pure water. The organic solvent is not particularly limited, and examples thereof include a hydrocarbon solvent, an ester solvent, an ether solvent, a halogen solvent, and an alcohol solvent. From the viewpoints of dispersion stability and storage stability, the dispersion may contain at least one compound selected from the group consisting of a dispersant and a surfactant. Known chemical substances are used as the dispersant and the surfactant. The dispersion may contain a binder as an emulsion.

The binder to be used in the composition is not particularly limited, and examples thereof include an organic binder such as a fluororesin, a silicone resin, a polyester resin, an acrylic resin, a styrene resin, an acrylonitrile/styrene copolymer resin, an acrylonitrile/butadiene/styrene copolymer (ABS) resin, an epoxy resin, a polycarbonate resin, a polyamide resin, a polyamine resin, a polyurethane resin, a polyether resin, a polysulfide resin, a polyphenol resin, and a compound thereof, and a resin obtained by silicone-modifying or halogen-modifying the above resins; and an inorganic binder such as glass, ceramic, metal powder, cement, gypsum, and diatomaceous earth.

The photocatalyst forming a composition according to the exemplary embodiment may contain other components. As other components, known additives are used, and examples thereof include a promoter, a colorant, a filler, a preservative, a defoaming agent, an adhesion improver, and a thickener.

The photocatalyst forming a composition according to the exemplary embodiment may contain one or two or more species of the silica titania composite aerogel particle according to the exemplary embodiment.

The content of the silica titania composite aerogel particle according to the exemplary embodiment in the photocatalyst forming a composition according to the exemplary embodiment is not particularly limited, and is properly selected in accordance with various forms of a dispersion and a resin composition, and a desired amount of the photocatalyst.

The method of producing the photocatalyst using the photocatalyst forming a composition according to the exemplary embodiment or producing the structure body having the photocatalyst is not particularly limited, and known applying methods are used. Examples of the applying method of the photocatalyst forming a composition according to the exemplary embodiment include a spin coating method, a dip coating method, a flow coating method, a spray coating method, a roll coating method, a brush coating method, a sponge coating method, a screen printing method, and an ink jet printing method.

<Photocatalyst and Structure Body>

The photocatalyst according to the exemplary embodiment contains the silica titania composite aerogel particle according to the exemplary embodiment or is formed of the silica titania composite aerogel particle according to the exemplary embodiment. The structure body according to the exemplary embodiment has the silica titania composite aerogel particle according to the exemplary embodiment.

The photocatalyst according to the exemplary embodiment may be a photocatalyst formed of the silica titania composite aerogel particle according to the exemplary embodiment, may be a photocatalyst obtained by mixing a promoter in the silica titania composite aerogel particle according to the exemplary embodiment, or may be a photocatalyst obtained by solidifying the silica titania composite aerogel particle according to the exemplary embodiment in a predetermined shape with an adhesive or a pressure sensitive adhesive.

The structure body according to the exemplary embodiment may have the silica titania composite aerogel particle according to the exemplary embodiment, as a photocatalyst. From the viewpoint of the photocatalyst activity, the structure body according to the exemplary embodiment may have the silica titania composite aerogel particle according to the exemplary embodiment at least on the surface.

The structure body according to the exemplary embodiment may be a structure body containing the silica titania composite aerogel particle according to the exemplary embodiment on at least a portion of the base material surface, or may be a structure body formed by applying the photocatalyst forming a composition according to the exemplary embodiment to at least a portion of the base material surface. In the structure body, the application amount of the photocatalyst forming a composition according to the exemplary embodiment is not particularly limited, and may be selected as desired.

In the structure body according to the exemplary embodiment, the silica titania composite aerogel particle according to the exemplary embodiment may be fixed even in a state of being attached to the surface of the base material, and from the viewpoint of the durability of the photocatalyst, may to be fixed. The fixing method is not particularly limited, and a known fixing method is used.

The base material used in the exemplary embodiment may be various materials regardless of inorganic materials and organic materials, and the shape thereof is also not limited. Examples of the base material include metal, ceramic, glass, plastic, rubber, stone, cement, concrete, fiber, cloth, wood, paper, a combination of aforementioned base materials, a laminate of the aforementioned base materials, and a product having at least one layer of a coating film on the surface of the aforementioned base materials. Examples of the base material seen from the viewpoint of usage, exterior and coating such as building materials, exterior materials, window frames, window glasses, mirrors, tables, dishes, curtains, lenses, prisms, and vehicle, exterior of machine equipment, exterior of goods, cover and coating of dustproof, exterior and coating of traffic signs, various display devices, advertising towers, sound insulation walls for roads, sound insulation walls for railroads, bridges and guardrails, interior and coating of tunnel, insulators, solar cell covers, solar water heater heat collecting covers, polymer films, polymer sheets, filters, indoor signboards, outdoor signboards, cover for vehicular illumination lamps, outdoor lighting equipment, air purifiers, water purifiers, medical instruments, and nursing care products.

EXAMPLES

Hereinafter, exemplary embodiments of the present invention will be described in detail with reference to examples, but the exemplary embodiments of the invention are not limited to these examples at all. In the following description, all "parts" are on a mass basis unless otherwise specified.

Example 1

[Dispersion Preparation Step]

In a reaction vessel, 115.4 parts of methanol and 7.2 parts of tetrametoxy silane are charged and mixed. Further, 7.2 parts of tetrabutoxy titanium are charged and mixed. While stirring the mixture at 100 rpm with a magnetic stirrer, 7.5 parts of 0.009% by mass of oxalic acid aqueous solution is added dropwise over 30 seconds. The mixture is kept for 30 minutes while stirring as it is so as to obtain 137.2 parts (solid content: 4.5 parts, liquid phase content: 132.7 parts) of dispersion (I-1).

[Solvent Removal Step]

137.2 parts of dispersion (I-1) is charged into the reaction tank, $CO_2$ is added while stirring at 85 rpm, and the temperature and pressure are raised and to 150° C./20 MPa. While stirring as it is, $CO_2$ is caused to flow in and out, and 130 parts of the liquid phase is removed over 60 minutes. The pressure is reduced to atmospheric pressure over 30 minutes, and 4.5 parts of powder is collected.

[Heat Treatment Step]

0.5 part of the powder is weighed in a SUS container and the SUS container is placed on a hot plate. The temperature is raised up to 380° C., and kept for 60 minutes, and allowed to cool down to 30° C., and then 0.5 part of powder (silica titania composite aerogel particle) is collected.

Comparative Examples 1 to 6 and Examples 2 to 8

Each of the silica titania composite aerogel particle is produced in the same manner as in Example 1, except that materials or treatment conditions are changed as indicated in Table 1.

Example 101

[Dispersion Preparation Step]

137.2 parts (solid content: 4.5 parts, liquid phase content: 132.7 parts) of dispersion (I-1) is obtained in the same manner as the dispersion preparation step in Example 1.

[Solvent Removal Step]

137.2 parts of dispersion (I-1) is charged into the reaction tank, $CO_2$ is added while stirring at 85 rpm, and the temperature and pressure are raised and to 150° C./20 MPa. While stirring as it is, $CO_2$ is caused to flow in and out, and 130 parts of the liquid phase is removed over 60 minutes.

[Surface Treatment Step]

4.5 parts of isobutyl trimethoxy silane is added over five minutes to a solid phase remaining after removing the liquid phase, and kept at 150° C./20 MPa for 30 minutes while stirring at 85 rpm. While stirring as it is, $CO_2$ is caused to flow in and out, and 3.5 parts of the liquid phase is removed over 30 minutes. The pressure is reduced to atmospheric pressure over 30 minutes, and 5.0 parts of powder is collected.

[Heat Treatment Step]

0.5 part of the powder is weighed in a SUS container and the SUS container is placed on a hot plate. The temperature is raised up to 380° C., and kept for 60 minutes, and allowed to cool down to 30° C., and then 0.5 part of powder (silica titania composite aerogel particle) is collected.

Comparative Examples 101 to 106 and Examples 102 to 123

Each of the silica titania composite aerogel particle is produced in the same manner as in Example 101, except that materials or treatment conditions are changed as indicated in Tables 2 and 3.

<Measurement of Physical Properties of Silica Titania Composite Aerogel Particle>

The physical properties of the silica titania composite aerogel particle obtained in each example is measured according to the following measurement method. The results are indicated in Table 4 to Table 6. In Tables 4 to 6, "UV-Vis characteristics" are absorbances at wavelengths of 450 nm, 600 nm and 750 nm, respectively, when the absorbance at 350 nm is set to be 1.

Example 201

[Dispersion Preparation Step]

In a reaction vessel, 115.4 parts of methanol and 7.2 parts of tetrametoxy silane are charged and mixed. Further, 7.2 parts of tetrabutoxy titanium are charged and mixed. While stirring the mixture at 100 rpm with a magnetic stirrer, 7.5 parts of 0.009% by mass of oxalic acid aqueous solution is added dropwise over 30 seconds. The mixture is kept for 30 minutes while stirring as it is so as to obtain 137.2 parts (solid content: 4.5 parts, liquid phase content: 132.7 parts) of a first dispersion (I-1).

137.2 parts of the first dispersion (I-1) is charged into the reaction vessel, a mixed liquid of 0.45 parts of tetrabutoxy titanium and 4.05 parts of butanol is added dropwise for 10 minutes while stirring at 100 rpm with a magnetic stirrer. The mixture is kept for 30 minutes while stirring as it is so as to obtain 141.7 parts (solid content: 3.5 parts, liquid phase content: 138.2 parts) of a second dispersion (II-1).

[Solvent Removal Step]

141.7 parts of the second dispersion (II-1) is charged into the reaction tank, $CO_2$ is added while stirring at 85 rpm, and the temperature and pressure are raised and to 150° C./20 MPa. While stirring as it is, $CO_2$ is caused to flow in and out, and 138 parts of the liquid phase is removed over 60 minutes. The pressure is reduced to atmospheric pressure over 30 minutes, and 3.5 parts of powder is collected.

[Heat Treatment Step]

0.5 part of the powder is weighed in a SUS container and the SUS container is placed on a hot plate. The temperature is raised up to 380° C., and kept for 60 minutes, and allowed to cool down to 30° C., and then 0.5 part of powder (silica titania composite aerogel particle) is collected.

Comparative Examples 201 to 206 and Examples 202 to 208

Each of the silica titania composite aerogel particle is produced in the same manner as in Example 201, except that materials or treatment conditions are changed as indicated in Table 7.

Example 301

[Dispersion Preparation Step]

141.7 parts (solid content: 3.5 parts, liquid phase content: 138.2 parts) of the second dispersion (II-1) is obtained in the same manner as the dispersion preparation step in Example 201.

[Solvent Removal Step]

141.7 parts of the second dispersion (II-1) is charged into the reaction tank, $CO_2$ is added while stirring at 85 rpm, and the temperature and pressure are raised and to 150° C./20 MPa. While stirring as it is, $CO_2$ is caused to flow in and out, and 138 parts of the liquid phase is removed over 60 minutes.

[Surface Treatment Step]

A mixture of 4.5 parts of isobutyl trimethoxy silane and 4.5 parts of methanol are added over five minutes to a solid phase remaining after removing the liquid phase, and kept at 150° C./20 MPa for 30 minutes while stirring at 85 rpm. While stirring as it is, $CO_2$ is caused to flow in and out, and 8.5 parts of the liquid phase is removed over 30 minutes. The pressure is reduced to atmospheric pressure over 30 minutes, and 4.0 parts of powder is collected.

[Heat Treatment Step]

0.5 part of the powder is weighed in a SUS container and the SUS container is placed on a hot plate. The temperature is raised up to 380° C., and kept for 60 minutes, and allowed to cool down to 30° C., and then 0.5 part of powder (silica titania composite aerogel particle) is collected.

Comparative Examples 301 to 306 and Examples 302 to 323

Each of the silica titania composite aerogel particle is produced in the same manner as in Example 301, except that materials or treatment conditions are changed as indicated in Tables 8 and 9.

It is confirmed that the silica titania composite aerogel particles in Examples 201 to 208 include the first layer on the base particle from the element profile.

It is confirmed that the silica titania composite aerogel particles in Examples 301 to 323 include the first layer and the second layer on the base particle from the element profile.

Example 401

[Dispersion Preparation Step]

In a reaction vessel, 115.4 parts of methanol and 7.2 parts of tetrametoxy silane are charged and mixed. Further, 7.2 parts of tetrabutoxy titanium are charged and mixed. While stirring the mixture at 100 rpm with a magnetic stirrer, 7.5 parts of 0.009% by mass of oxalic acid aqueous solution is added dropwise over 30 seconds. The mixture is kept for 30 minutes while stirring as it is so as to obtain 137.2 parts (solid content: 4.5 parts, liquid phase content: 132.7 parts) of a first dispersion (I-1).

137.2 parts of the first dispersion (I-1) is charged into the reaction vessel, a mixed liquid of 0.45 parts of tetrabutoxy titanium and 4.05 parts of butanol is added dropwise for 10 minutes while stirring at 100 rpm with a magnetic stirrer. The mixture is kept for 30 minutes while stirring as it is so as to obtain 141.7 parts (solid content: 3.5 parts, liquid phase content: 138.2 parts) of a second dispersion (II-1).

[Solvent Removal Step]

141.7 parts of the second dispersion (II-1) is charged into the reaction tank, $CO_2$ is added while stirring at 85 rpm, and the temperature and pressure are raised and to 150° C./20 MPa. While stirring as it is, $CO_2$ is caused to flow in and out, and 138 parts of the liquid phase is removed over 60 minutes.

[Surface Treatment Step]

A mixture of 4.5 parts of isobutyl trimethoxy silane and 4.5 parts of methanol are added over five minutes to a solid phase remaining after removing the liquid phase, and kept at 150° C./20 MPa for 30 minutes while stirring at 85 rpm. While stirring as it is, $CO_2$ is caused to flow in and out, and 8.5 parts of the liquid phase is removed over 30 minutes. The pressure is reduced to atmospheric pressure over 30 minutes, and 4.0 parts of powder is collected.

[Heat Treatment Step]

0.5 part of the powder is weighed in a SUS container and the SUS container is placed on a hot plate. The temperature is raised up to 380° C., and kept for 60 minutes, and allowed to cool down to 30° C., and then 0.5 part of powder (silica titania composite aerogel particle) is collected.

Example 402 to Example 408, Example 411 to Example 417, Example 421 to Example 436, Comparative Example 401 to Comparative Example 406, and Comparative Example 411 to Comparative Example 416

Each of the silica titania composite aerogel particle is produced in the same manner as in Example 401, except that materials or treatment conditions are changed as indicated in Table 13.

Note that, the silica titania composite aerogel particles in Example 401 to Example 408, Example 411 to Example 417, and Example 421 to Example 436 had absorption in the entire wavelength range of 400 nm to 800 nm.

[Element Ratio Si/Ti in Base Particle]

By using an XPS analyzer, the qualitative analysis (wide scan analysis) is performed while etching in the depth direction from the surface of the silica titania composite aerogel particle, and titanium, silicon, and carbon are identified and quantified. From the obtained data, for each of titanium, silicon, and carbon, an element profile of which a vertical axis represents a peak intensity and a horizontal axis represents an etching time is drawn, a profile curve is divided into plural regions by an inflection point, a region (the region A) which is present at the final stage of etching, and in which the peak intensity of titanium and the peak intensity of silicon are almost constant is specified, and then an element ratio Si/Ti in the region is obtained.

XPS analyzer: VERSA PROBEII manufactured by ULVAC, Inc.

X-ray source: monochromated AlKa ray

Acceleration voltage: 15 kV

X-ray beam diameter: 100 μm

Etching gun: Argon ion beam

Etching output: 4 kV

It is confirmed that the silica titania composite particles in Examples 101 to 123 include the first surface layer on the base particle from the element profile.

[BET Specific Surface Area]

By using "MACSORB HM model 1201 type" manufactured by Mountech Co.,Ltd. as a specific surface area measuring apparatus, 50 mg of sample is pretreated at 30° C. for 120 minutes for degassing so as to obtain a BET specific surface area by a BET multipoint method using nitrogen gas with purity of 99.99% or more.

[Average Diameter (Average Primary Particle Diameter) of the Primary Particles Constituting the Base Particles]

With respect to 100 parts by mass of resin particles (styrene-butyl acrylate copolymer particles (copolymerization ratio (mass ratio)=80: 20, weight average molecular weight Mw=130,000, glass transition temperature Tg=59° C.) having a volume average particle diameter of 8 µm, 1.0 part by mass of titanium oxide aerogel particles are mixed and blended at 13000 rpm for two minutes by using a sample mill (model SK-M2 type) (manufactured by kyoritsu-riko.cojp.).

The silica titania composite aerogel particle dispersed in the resin particle is observed by using a scanning electron microscope SEM (scanning electron microscope) apparatus (S-4100 manufactured by Hitachi, Ltd.), and the image is captured. At this time, as schematically illustrated in FIG. 1, individual particles forming an aggregated particle are set as primary particles, and images are captured by adjusting the scanning electron microscope to a magnification capable of image analysis of the primary particles. The captured images are taken into an image analyzing apparatus (LUZEX III, manufactured by Nireco Corporation), an area for each particle is measured by image analysis of primary particles, a circle equivalent diameter (nm) is calculated from the area value, and an average of the circle equivalent diameter is set as an average primary particle diameter (nm) (referred to as "Dp" in Tables 4 to 6). The average primary particle diameter is obtained by analyzing 10 to 50 primary particles.

[Volume Average Particle Diameter and Volume Particle Size Distribution of Silica Titania Composite Aerogel Particle]

With respect to 100 parts by mass of resin particles (styrene-butyl acrylate copolymer particles (copolymerization ratio (mass ratio)=80: 20, weight average molecular weight Mw=130,000, glass transition temperature Tg=59° C.) having a volume average particle diameter of 8 µm, 1.0 part by mass of titanium oxide aerogel particles are mixed and blended at 13000 rpm for two minutes by using a sample mill (model SK-M2 type) (manufactured by kyoritsu-riko.cojp.).

0.1 g of mixed particle is put into a beaker, and 1.5 g of an aqueous surfactant solution in which anionic surfactant (TAYCA POWER BN 2060, manufactured by Tayca Corporation) is diluted such that the concentration thereof becomes 12% with ion exchanged water is added, and the mixed particle is sufficiently wetted. Subsequently, 5 g of pure water is added, followed by dispersion in an ultrasonic disperser for 30 minutes, and then the resin particles are removed with filter paper No. 5C so as to obtain a silica titania composite aerogel particle dispersion. The particle diameter of the particles in the silica titania composite aerogel particle dispersion is measured with a dynamic light ovulation type particle size measuring device (NANOTRAC UPA-ST, manufactured by MicrotracBEL Corp.) so as to obtain a volume-based particle size distribution. The particle diameter D50v having the particle diameter of cumulative 50% from the small diameter side is obtained and set as the volume average particle diameter (µm) (referred to as "Da" in Tables 4 to 6). Further, particle diameter the D10v having the particle diameter of cumulative 10% from the small diameter side, and a particle diameter D90v having the particle diameter of cumulative 90% from the small diameter side are determined so as to calculate the volume particle size distribution of $GSDv=(D90v \div D10v)^{1/2}$.

[Ultraviolet-Visible Absorption Spectrum]

First, the silica titania composite aerogel particle is dispersed in tetrahydrofuran, then applied onto a glass substrate, and the applied glass substrate is dried at 24° C. in the atmosphere. By using a spectrophotometer U-4100 (manufactured by Hitachi High-Technologies Corporation) under the setting of a scan speed: 600 nm, a slit width: 2 nm, and a sampling interval: 1 nm, a diffuse reflection spectrum a wavelength in a range of 200 nm to 900 nm is measured in a diffraction reflection arrangement. The absorbance at each wavelength is theoretically obtained from the diffuse reflection spectrum by Kubelka-Munk transformation so as to obtain a UV visible absorption spectrum.

The silica titania composite aerogel particles of Examples 1 and 8 and Examples 101 to 123 had absorption in the entire wavelength range of 400 nm to 800 nm.

<Evaluation of Silica Titania Composite Aerogel Particle Performance>

[Gas Adsorptivity and Gas Decomposability]

As the activity of the silica titania composite aerogel particle obtained in each example, the gas adsorptivity and the gas decomposability by irradiation with visible light are evaluated. The results are indicated in Table 4 to Table 6.

The silica titania composite aerogel particle obtained in each example is dispersed in methanol so that the solid content concentration is 4% by mass. 0.25 g of the dispersion is applied to half of the glass plate for microscope (area 10 cm2), and then sufficiently dried so as to produce a test piece in which particles are uniformly attached to the surface (half) of the glass plate. Two test pieces are produced for the silica titania composite aerogel particle in each particle of each example.

Immediately after producing the test piece, the test piece is put into a TEDLAR bag with one mouth cock having capacity of 1 L (one test piece is put in one TEDLAR bag), air inside the TEDLAR bag is pushed so as to seal the TEDLAR bag, then the TEDLAR bag is placed in the dark place with the coated side facing up, and stored until the performance evaluation test.

The performance evaluation test is performed in the following procedure.

First, the residual air in the inside is all discharged from the cock of the TEDLAR bag with the test piece with an aspirator, and then 800 ml of ammonia gas at a concentration of 100 ppm is injected. Next, one of two same types of TEDLAR bags with test pieces is continuously irradiated with visible light (6,000 LX (lux) on the surface of the test piece) by using a light emitting diode (LED) that irradiates the visible light at a wavelength in a range of 400 nm to 800 nm. The other one of the two same types of TEDLAR bags with test pieces is placed in a dark box to which light is not incident, and kept for one hour.

A TEDLAR bag with test pieces after one hour continuous irradiation with visible light, a TEDLAR bag with test pieces kept in dark box for one hour, and ammonia gas concentration in each TEDLAR bag are measured using a detection tube (manufactured by GASTEC CORPORATION). Then, from the following formula, an index AA of ammonia gas adsorptivity and an ammonia gas decomposition rate AS by irradiation with visible light are obtained.

S1=Ammonia gas concentration (ppm) in TEDLAR bag after one hour continuous irradiation with visible light S2=Ammonia gas concentration (ppm) in TEDLAR bag after storage in a dark box for one hour Index ΔA(ppm) of ammonia gas adsorptivity=100−S2

Ammonia gas decomposition rate ΔS (%)=(S2−S1)÷S2×100

From the above values, the gas adsorptivity and the gas decomposability are evaluated as follows.

—Gas Adsorptivity—

G1 (A): 90≤ΔA, adsorptivity is very good. G2 (B): 70≤ΔA<90, adsorptivity is good. G3 (C): 50≤ΔA<70, adsorptivity is pretty good. G4 (D): ΔA<50, adsorptivity is poor.

—Gas Decomposability—

G1 (A): 30≤ΔS, decomposability is very good. G2 (B): 15≤ΔS<30, decomposability is good. G3 (V): 5≤ΔS<15, decomposability is pretty good. G4 (D): ΔS<5, decomposability is poor.

[Amount of Coarse Particles]

A sieve with an opening of 20 μm is prepared and its weight is precisely weighed to the unit of 0.01 g. 1.00 g of silica titania composite aerogel particles are passed through the sieve while suctioning with a dust collector. At that time, the aggregate on the sieve passed through the sieve while disintegrating using a brush, and a strong agglomerate which is not disintegrated is left on the sieve. The coarse particle index is calculated from the weight (g) of the sieve before and after passing through the silica titania composite aerogel particles by the following formula. The results are indicated in Table 4 to Table 6.

Coarse particle index (%)=(weight of sieve after passing−weight of sieve before passing)÷1.00× 100

A (A): Coarse particle index is equal to or less than 1%. B (B): Coarse particle index is greater than 1% and equal to or less than 5%. C (C): Coarse particle index is greater than 5%.

TABLE 1

| | Preparation of dispersion | | | | | | |
|---|---|---|---|---|---|---|---|
| | Alcohol | | Alkoxy silane | | Titanium alkoxide | | |
| | Species | Amount [Parts] | Species | Amount [Parts] | Species | Amount [Parts] | Holding time [Minutes] |
| Example 1 | Methanol | 115.4 | Tetramethoxy silane | 7.2 | Tetrabutoxy titanium | 7.2 | 30 |
| Comparative Example 1 | Methanol | 115.4 | Tetramethoxy silane | 10.9 | Tetrabutoxy titanium | 3.4 | 30 |
| Comparative Example 2 | Methanol | 5 | Tetramethoxy silane | 7.2 | Tetrabutoxy titanium | 7.2 | 30 |
| Comparative Example 3 | Methanol | 450 | Tetramethoxy silane | 7.2 | Tetrabutoxy titanium | 7.2 | 30 |
| Comparative Example 4 | Methanol | 115.4 | Tetramethoxy silane | 7.2 | Tetrabutoxy titanium | 7.2 | 30 |
| Comparative Example 5 | Methanol | 115.4 | Tetramethoxy silane | 7.2 | Tetrabutoxy titanium | 7.2 | 30 |
| Comparative Example 6 | Methanol | 115.4 | Tetramethoxy silane | 7.2 | Tetrabutoxy titanium | 7.2 | 30 |
| Example 2 | Methanol | 115.4 | Tetramethoxy silane | 10.3 | Tetrabutoxy titanium | 4 | 30 |
| Example 3 | Methanol | 115.4 | Tetramethoxy silane | 0.3 | Tetrabutoxy titanium | 14 | 30 |
| Example 4 | Methanol | 346.2 | Tetramethoxy silane | 7.2 | Tetrabutoxy titanium | 7.2 | 30 |
| Example 5 | Methanol | 23.1 | Tetramethoxy silane | 7.2 | Tetrabutoxy titanium | 7.2 | 30 |
| Example 6 | Methanol | 115.4 | Tetramethoxy silane | 7.2 | Tetrabutoxy titanium | 7.2 | 30 |
| Example 7 | Methanol | 115.4 | Tetramethoxy silane | 7.2 | Tetrabutoxy titanium | 7.2 | 30 |
| Example 8 | Methanol | 115.4 | Tetramethoxy silane | 7.2 | Tetrapropoxy titanium | 7.2 | 30 |

| | | Surface treatment | | | | |
|---|---|---|---|---|---|---|
| | | | | Organometallic compound | Heat treatment | |
| | Solvent removal Treatment atmosphere | Treatment atmosphere | Species | Amount [parts] | Temperature [° C.] | Time [Minutes] |
| Example 1 | Supercritical carbon dioxide | | —(No surface layer) | | 380 | 60 |
| Comparative Example 1 | Supercritical carbon dioxide | | —(No surface layer) | | 380 | 60 |
| Comparative Example 2 | Supercritical carbon dioxide | | —(No surface layer) | | 380 | 60 |
| Comparative Example 3 | Supercritical carbon dioxide | | —(No surface layer) | | 380 | 60 |
| Comparative Example 4 | Supercritical carbon dioxide | | —(No surface layer) | | 160 | 60 |
| Comparative Example 5 | Supercritical carbon dioxide | | —(No surface layer) | | 600 | 60 |
| Comparative Example 6 | Supercritical carbon dioxide | | —(No surface layer) | | — | — |
| Example 2 | Supercritical carbon dioxide | | —(No surface layer) | | 380 | 60 |

TABLE 1-continued

| | | | | |
|---|---|---|---|---|
| Example 3 | Supercritical carbon dioxide | —(No surface layer) | 380 | 60 |
| Example 4 | Supercritical carbon dioxide | —(No surface layer) | 380 | 60 |
| Example 5 | Supercritical carbon dioxide | —(No surface layer) | 380 | 60 |
| Example 6 | Supercritical carbon dioxide | —(No surface layer) | 380 | 60 |
| Example 7 | Supercritical carbon dioxide | —(No surface layer) | 380 | 60 |
| Example 8 | Supercritical carbon dioxide | —(No surface layer) | 380 | 60 |

TABLE 2

| | Preparation of dispersion | | | | | | | |
|---|---|---|---|---|---|---|---|---|
| | Alcohol | | Alkoxy silane | | Titanium alkoxide | | | |
| | Species | Amount [Parts] | Species | Amount [Parts] | Species | Amount [Parts] | Holding time [Minutes] | Solvent removal Treatment atmosphere |
| Example 101 | Methanol | 115.4 | Tetramethoxy silane | 7.2 | Tetrabutoxy titanium | 7.2 | 30 | Supercritical carbon dioxide |
| Comparative Example 101 | Methanol | 115.4 | Tetramethoxy silane | 10.9 | Tetrabutoxy titanium | 3.4 | 30 | Supercritical carbon dioxide |
| Comparative Example 102 | Methanol | 5 | Tetramethoxy silane | 7.2 | Tetrabutoxy titanium | 7.2 | 30 | Supercritical carbon dioxide |
| Comparative Example 103 | Methanol | 450 | Tetramethoxy silane | 7.2 | Tetrabutoxy titanium | 7.2 | 30 | Supercritical carbon dioxide |
| Comparative Example 104 | Methanol | 115.4 | Tetramethoxy silane | 7.2 | Tetrabutoxy titanium | 7.2 | 30 | Supercritical carbon dioxide |
| Comparative Example 105 | Methanol | 115.4 | Tetramethoxy silane | 7.2 | Tetrabutoxy titanium | 7.2 | 30 | Supercritical carbon dioxide |
| Comparative Example 106 | Methanol | 115.4 | Tetramethoxy silane | 7.2 | Tetrabutoxy titanium | 7.2 | 30 | Supercritical carbon dioxide |
| Example 102 | Methanol | 115.4 | Tetramethoxy silane | 10.3 | Tetrabutoxy titanium | 4 | 30 | Supercritical carbon dioxide |
| Example 103 | Methanol | 115.4 | Tetramethoxy silane | 0.3 | Tetrabutoxy titanium | 14 | 30 | Supercritical carbon dioxide |
| Example 104 | Methanol | 346.2 | Tetramethoxy silane | 7.2 | Tetrabutoxy titanium | 7.2 | 30 | Supercritical carbon dioxide |
| Example 105 | Methanol | 23.1 | Tetramethoxy silane | 7.2 | Tetrabutoxy titanium | 7.2 | 30 | Supercritical carbon dioxide |
| Example 106 | Methanol | 115.4 | Tetramethoxy silane | 7.2 | Tetrabutoxy titanium | 7.2 | 30 | Supercritical carbon dioxide |
| Example 107 | Methanol | 115.4 | Tetraethoxy silane | 7.2 | Tetrabutoxy titanium | 7.2 | 30 | Supercritical carbon dioxide |
| Example 108 | Methanol | 115.4 | Tetraethoxy silane | 7.2 | Tetrapropoxy titanium | 7.2 | 30 | Supercritical carbon dioxide |

| | Surface treatment | | | Heat treatment | |
|---|---|---|---|---|---|
| | | Organometallic compound | | | |
| | Treatment atmosphere | Species | Amount [parts] | Temperature [° C.] | Time [Minutes] |
| Example 101 | Supercritical carbon dioxide | Isobutyl trimethoxy silane | 4.5 | 380 | 60 |
| Comparative Example 101 | Supercritical carbon dioxide | Isobutyl trimethoxy silane | 4.5 | 380 | 60 |
| Comparative Example 102 | Supercritical carbon dioxide | Isobutyl trimethoxy silane | 4.5 | 380 | 60 |
| Comparative Example 103 | Supercritical carbon dioxide | Isobutyl trimethoxy silane | 4.5 | 380 | 60 |
| Comparative Example 104 | Supercritical carbon dioxide | Isobutyl trimethoxy silane | 4.5 | 160 | 60 |
| Comparative Example 105 | Supercritical carbon dioxide | Isobutyl trimethoxy silane | 4.5 | 600 | 60 |
| Comparative Example 106 | Supercritical carbon dioxide | Isobutyl trimethoxy silane | 4.5 | — | — |
| Example 102 | Supercritical carbon dioxide | Isobutyl trimethoxy silane | 4.5 | 380 | 60 |
| Example 103 | Supercritical carbon dioxide | Isobutyl trimethoxy silane | 4.5 | 380 | 60 |

TABLE 2-continued

| | | | | | |
|---|---|---|---|---|---|
| Example 104 | Supercritical carbon dioxide | Isobutyl trimethoxy silane | 4.5 | 380 | 60 |
| Example 105 | Supercritical carbon dioxide | Isobutyl trimethoxy silane | 4.5 | 380 | 60 |
| Example 106 | Supercritical carbon dioxide | Isobutyl trimethoxy silane | 4.5 | 380 | 60 |
| Example 107 | Supercritical carbon dioxide | Isobutyl trimethoxy silane | 4.5 | 380 | 60 |
| Example 108 | Supercritical carbon dioxide | Isobutyl trimethoxy silane | 4.5 | 380 | 60 |

TABLE 3

| | Preparation of dispersion | | | | | | | |
|---|---|---|---|---|---|---|---|---|
| | Alcohol | | Alkoxy silane | | Titanium alkoxide | | Holding | |
| | Species | Amount [Parts] | Species | Amount [Parts] | Species | Amount [Parts] | time [Minutes] | Solvent removal Treatment atmosphere |
| Example 109 | Methanol | 115.4 | Tetramethoxy silane | 7.2 | Tetrabutoxy titanium | 7.2 | 30 | Supercritical carbon dioxide |
| Example 110 | Methanol | 115.4 | Tetramethoxy silane | 7.2 | Tetrabutoxy titanium | 7.2 | 30 | Supercritical carbon dioxide |
| Example 111 | Methanol | 115.4 | Tetramethoxy silane | 7.2 | Tetrabutoxy titanium | 7.2 | 30 | Supercritical carbon dioxide |
| Example 112 | Methanol | 115.4 | Tetramethoxy silane | 7.2 | Tetrabutoxy titanium | 7.2 | 30 | Supercritical carbon dioxide |
| Example 113 | Methanol | 115.4 | Tetramethoxy silane | 7.2 | Tetrabutoxy titanium | 7.2 | 30 | Supercritical carbon dioxide |
| Example 114 | Methanol | 115.4 | Tetramethoxy silane | 7.2 | Tetrabutoxy titanium | 7.2 | 30 | Supercritical carbon dioxide |
| Example 115 | Methanol | 115.4 | Tetramethoxy silane | 7.2 | Tetrabutoxy titanium | 7.2 | 30 | Supercritical carbon dioxide |
| Example 116 | Methanol | 115.4 | Tetramethoxy silane | 7.2 | Tetrabutoxy titanium | 7.2 | 30 | Supercritical carbon dioxide |
| Example 117 | Methanol | 115.4 | Tetramethoxy silane | 7.2 | Tetrabutoxy titanium | 7.2 | 30 | Supercritical carbon dioxide |
| Example 118 | Methanol | 115.4 | Tetramethoxy silane | 7.2 | Tetrabutoxy titanium | 7.2 | 30 | Supercritical carbon dioxide |
| Example 119 | Methanol | 115.4 | Tetramethoxy silane | 7.2 | Tetrabutoxy titanium | 7.2 | 30 | Supercritical carbon dioxide |
| Example 120 | Methanol | 115.4 | Tetramethoxy silane | 7.2 | Tetrabutoxy titanium | 7.2 | 30 | Supercritical carbon dioxide |
| Example 121 | Methanol | 115.4 | Tetramethoxy silane | 7.2 | Tetrabutoxy titanium | 7.2 | 30 | Supercritical carbon dioxide |
| Example 122 | Methanol | 115.4 | Tetramethoxy silane | 7.2 | Tetrabutoxy titanium | 7.2 | 30 | Supercritical carbon dioxide |
| Example 123 | Methanol | 115.4 | Tetramethoxy silane | 7.2 | Tetrabutoxy titanium | 7.2 | 30 | Supercritical carbon dioxide |

| | Surface treatment | | | Heat treatment | |
|---|---|---|---|---|---|
| | | Organometallic compound | | | |
| | Treatment atmosphere | Species | Amount [parts] | Temperature [° C.] | Time [Minutes] |
| Example 109 | Supercritical carbon dioxide | Hexyl trimethoxy silane | 4.5 | 380 | 60 |
| Example 110 | Supercritical carbon dioxide | Decyl trimethoxy silane | 4.5 | 380 | 60 |
| Example 111 | Supercritical carbon dioxide | Methyl trimethoxy silane | 4.5 | 380 | 60 |
| Example 112 | Supercritical carbon dioxide | Dodecyl trimethoxy silane | 4.5 | 380 | 60 |
| Example 113 | Supercritical carbon dioxide | Octadecyl trimethoxy silane | 4.5 | 380 | 60 |
| Example 114 | Supercritical carbon dioxide | Octyl trichloro silane | 4.5 | 380 | 60 |
| Example 115 | Supercritical carbon dioxide | Dimethoxy (methyl) (octyl) silane | 4.5 | 380 | 60 |
| Example 116 | Supercritical carbon dioxide | Tri-n-hexyl chlorosilane | 4.5 | 380 | 60 |
| Example 117 | Supercritical carbon dioxide | n-octyl dimethyl chlorosilane | 4.5 | 380 | 60 |

TABLE 3-continued

|  |  |  |  |  |  |
|---|---|---|---|---|---|
| Example 118 | Supercritical carbon dioxide | Hexamethyl disilazane | 4.5 | 380 | 60 |
| Example 119 | Supercritical carbon dioxide | Isopropyl triisostearoyltitanate | 4.5 | 380 | 60 |
| Example 120 | Supercritical carbon dioxide | Acetoallcoxy aluminum diisopropylate | 4.5 | 380 | 60 |
| Example 121 | Nitrogen (dry type) | Isobutyl trimethoxy silane | 4.5 | 380 | 60 |
| Example 122 | Supercritical carbon dioxide | Isobutyl trimethoxy silane | 4.5 | 180 | 60 |
| Example 123 | Supercritical carbon dioxide | Isobutyl trimethoxy silane | 4.5 | 500 | 60 |

TABLE 4

| | Characteristics of silica titania composite aerogel particle | | | | | UV-Vis characteristics | | | Performance evaluation | | |
|---|---|---|---|---|---|---|---|---|---|---|---|
| | Element ratio Si/Ti of base particle | BET specific area [$m^2/g$] | Dp [nm] | Da [µm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 1 | 3.0 | 700 | 50 | 0.5 | 2.5 | 0.25 | 0.14 | 0.07 | G2 (B) | G2 (B) | A |
| Comparative Example 1 | 7.1 | 800 | 40 | 0.6 | 3.0 | 0.25 | 0.15 | 0.07 | G2 (B) | G4 (D) | A |
| Comparative Example 2 | 3.0 | 1300 | 10 | 5.0 | 13 | 0.25 | 0.14 | 0.07 | G2 (B) | G3 (C) | C |
| Comparative Example 3 | 3.0 | 180 | 110 | 0.2 | 1.1 | 0.26 | 0.14 | 0.07 | G4 (D) | G3 (C) | A |
| Comparative Example 4 | 3.0 | 700 | 50 | 0.5 | 2.5 | 0 | 0 | 0 | G2 (B) | G4 (D) | A |
| Comparative Example 5 | 3.0 | 700 | 50 | 0.5 | 2.5 | 0.01 | 0.01 | 0.01 | G2 (B) | G3 (C) | A |
| Comparative Example 6 | 3.0 | 700 | 50 | 0.5 | 2.5 | 0 | 0 | 0 | G2 (B) | G4 (D) | A |
| Example 2 | 5.7 | 700 | 50 | 0.5 | 2.5 | 0.25 | 0.15 | 0.07 | G2 (B) | G3 (C) | A |
| Example 3 | 0.05 | 400 | 70 | 0.5 | 2.5 | 0.25 | 0.14 | 0.08 | G2 (B) | G2 (B) | A |
| Example 4 | 3.1 | 220 | 80 | 0.1 | 1.6 | 0.25 | 0.14 | 0.07 | G3 (C) | G2 (B) | A |
| Example 5 | 3.2 | 1150 | 20 | 2.8 | 9.0 | 0.25 | 0.16 | 0.07 | G2 (B) | G2 (B) | B |
| Example 6 | 3.0 | 600 | 50 | 0.5 | 2.5 | 0.27 | 0.14 | 0.07 | G2 (B) | G2 (B) | A |
| Example 7 | 2.4 | 600 | 50 | 0.5 | 2.5 | 0.26 | 0.15 | 0.07 | G2 (B) | G2 (B) | A |
| Example 8 | 2.6 | 550 | 60 | 0.5 | 2.5 | 0.27 | 0.14 | 0.07 | G2 (B) | G2 (B) | A |

TABLE 5

| | Characteristics of silica titania composite aerogel particle | | | | | UV-Vis characteristics | | | Performance evaluation | | |
|---|---|---|---|---|---|---|---|---|---|---|---|
| | Element ratio Si/Ti of base particle | BET specific area [$m^2/g$] | Dp [nm] | Da [µm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 101 | 3.0 | 700 | 50 | 0.5 | 2.5 | 0.60 | 0.38 | 0.24 | G1 (A) | G1 (A) | A |
| Comparative Example 101 | 7.1 | 800 | 40 | 0.6 | 3.0 | 0.58 | 0.34 | 0.24 | G1 (A) | G4 (D) | A |
| Comparative Example 102 | 3.0 | 1300 | 15 | 4.5 | 13 | 0.60 | 0.37 | 0.24 | G1 (A) | G2 (B) | C |
| Comparative Example 103 | 3.0 | 180 | 110 | 0.2 | 1.1 | 0.61 | 0.38 | 0.25 | G4 (D) | G2 (B) | A |
| Comparative Example 104 | 3.0 | 700 | 50 | 0.5 | 2.5 | 0 | 0 | 0 | G1 (A) | G4 (D) | A |
| Comparative Example 105 | 3.0 | 700 | 50 | 0.5 | 2.5 | 0.01 | 0.01 | 0.01 | G1 (A) | G3 (C) | A |
| Comparative Example 106 | 3.0 | 700 | 50 | 0.5 | 2.5 | 0 | 0 | 0 | G1 (A) | G4 (D) | A |
| Example 102 | 5.7 | 700 | 50 | 0.5 | 2.5 | 0.60 | 0.39 | 0.24 | G1 (A) | G2 (B) | A |
| Example 103 | 0.05 | 400 | 70 | 0.5 | 2.5 | 0.70 | 0.38 | 0.24 | G2 (B) | G1 (A) | A |
| Example 104 | 3.1 | 220 | 80 | 0.1 | 1.6 | 0.60 | 0.38 | 0.22 | G2 (B) | G1 (A) | A |
| Example 105 | 3.2 | 1150 | 19 | 2.8 | 9.8 | 0.61 | 0.39 | 0.23 | G1 (A) | G1 (A) | B |
| Example 106 | 3.0 | 600 | 50 | 0.5 | 2.5 | 0.62 | 0.38 | 0.24 | G1 (A) | G1 (A) | A |

TABLE 5-continued

| | Characteristics of silica titania composite aerogel particle | | | | | UV-Vis characteristics | | | Performance evaluation | | |
|---|---|---|---|---|---|---|---|---|---|---|---|
| | Element ratio Si/Ti of base particle | BET specific area [m²/g] | Dp [nm] | Da [μm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 107 | 2.4 | 600 | 50 | 0.5 | 2.5 | 0.60 | 0.39 | 0.24 | G1 (A) | G1 (A) | A |
| Example 108 | 2.6 | 550 | 60 | 0.5 | 2.5 | 0.60 | 0.38 | 0.23 | G1 (A) | G1 (A) | A |

TABLE 6

| | Characteristics of silica titania composite aerogel particle | | | | | UV-Vis characteristics | | | Performance evaluation | | |
|---|---|---|---|---|---|---|---|---|---|---|---|
| | Element ratio Si/Ti | BET specific area [m²/g] | Dp [nm] | Da [μm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 109 | 3.0 | 605 | 50 | 0.5 | 2.5 | 0.60 | 0.38 | 0.25 | G1 (A) | G1 (A) | A |
| Example 110 | 3.0 | 610 | 50 | 0.5 | 2.5 | 0.63 | 0.38 | 0.24 | G1 (A) | G1 (A) | A |
| Example 111 | 3.0 | 590 | 50 | 0.5 | 2.5 | 0.61 | 0.38 | 0.20 | G2 (B) | G2 (B) | A |
| Example 112 | 3.0 | 590 | 50 | 0.5 | 2.5 | 0.61 | 0.39 | 0.25 | G2 (B) | G2 (B) | A |
| Example 113 | 3.0 | 600 | 50 | 0.5 | 2.5 | 0.60 | 0.38 | 0.24 | G2 (B) | G2 (B) | A |
| Example 114 | 3.0 | 600 | 50 | 0.5 | 2.5 | 0.60 | 0.39 | 0.24 | G2 (B) | G2 (B) | A |
| Example 115 | 3.0 | 595 | 50 | 0.5 | 2.5 | 0.61 | 0.39 | 0.25 | G2 (B) | G2 (B) | A |
| Example 116 | 3.0 | 610 | 50 | 0.5 | 2.5 | 0.60 | 0.40 | 0.23 | G2 (B) | G2 (B) | A |
| Example 117 | 3.0 | 600 | 50 | 0.5 | 2.5 | 0.62 | 0.38 | 0.20 | G2 (B) | G2 (B) | A |
| Example 118 | 3.0 | 600 | 50 | 0.5 | 2.5 | 0.60 | 0.38 | 0.24 | G2 (B) | G2 (B) | A |
| Example 119 | 3.0 | 600 | 50 | 0.5 | 2.5 | 0.63 | 0.38 | 0.19 | G2 (B) | G2 (B) | A |
| Example 120 | 3.0 | 600 | 50 | 0.5 | 2.5 | 0.60 | 0.38 | 0.25 | G2 (B) | G2 (B) | A |
| Example 121 | 3.0 | 500 | 50 | 0.7 | 2.5 | 0.60 | 0.38 | 0.25 | G3 (C) | G1 (A) | A |
| Example 122 | 3.0 | 500 | 50 | 0.5 | 2.5 | 0.22 | 0.15 | 0.12 | G2 (B) | G2 (B) | A |
| Example 123 | 3.0 | 650 | 50 | 0.5 | 2.5 | 0.20 | 0.11 | 0.09 | G2 (B) | G2 (B) | A |

Details of the organometallic compounds indicated in Table 3 are as described below.
Isopropyl triisostearoyl titanate: PLAINACT TTS produced by Ajinomoto Co., Inc.
Acetoalkoxy aluminum diisopropylate: PLAINACT AL-M produced by Ajinomoto Co., Inc.

From the results of the performance evaluations illustrated in Tables 4 to 6, it is understood that the present examples are excellent in the photocatalytic activity in the visible light region as compared with the comparative examples. In addition, it is understood that the amount of coarse particles is small in the present examples.

TABLE 7

| | Preparation of dispersion First dispersion | | | | | | |
|---|---|---|---|---|---|---|---|
| | Alcohol | | Alkoxy silane | | Titanium alkoxide | | Holding time [Minutes] |
| | Species | Amount [parts] | Species | Amount [parts] | Species | Amount [parts] | |
| Example 201 | Methanol | 115.4 | Tetramethoxy silane | 7.2 | Tetrabutoxy titanium | 7.2 | 30 |

TABLE 7-continued

| | | | | | | | |
|---|---|---|---|---|---|---|---|
| Comparative Example 201 | Methanol | 115.4 | Tetramethoxy silane | 10.9 | Tetrabutoxy titanium | 3.4 | 30 |
| Comparative Example 202 | Methanol | 5 | Tetramethoxy silane | 7.2 | Tetrabutoxy titanium | 7.2 | 30 |
| Comparative Example 203 | Methanol | 450 | Tetramethoxy silane | 7.2 | Tetrabutoxy titanium | 7.2 | 30 |
| Comparative Example 204 | Methanol | 115.4 | Tetramethoxy silane | 7.2 | Tetrabutoxy titanium | 7.2 | 30 |
| Comparative Example 205 | Methanol | 115.4 | Tetramethoxy silane | 7.2 | Tetrabutoxy titanium | 7.2 | 30 |
| Comparative Example 206 | Methanol | 115.4 | Tetramethoxy silane | 7.2 | Tetrabutoxy titanium | 7.2 | 30 |
| Example 202 | Methanol | 115.4 | Tetramethoxy silane | 10.3 | Tetrabutoxy titanium | 4 | 30 |
| Example 203 | Methanol | 115.4 | Tetramethoxy silane | 0.3 | Tetrabutoxy titanium | 14 | 30 |
| Example 204 | Methanol | 346.2 | Tetramethoxy silane | 7.2 | Tetrabutoxy titanium | 7.2 | 30 |
| Example 205 | Methanol | 23.1 | Tetramethoxy silane | 7.2 | Tetrabutoxy titanium | 7.2 | 30 |
| Example 206 | Methanol | 115.4 | Tetramethoxy silane | 7.2 | Tetrabutoxy titanium | 7.2 | 30 |
| Example 207 | Methanol | 115.4 | Tetraethoxy silane | 7.2 | Tetrabutoxy titanium | 7.2 | 30 |
| Example 208 | Methanol | 115.4 | Tetramethoxy silane | 7.2 | Tetrapropoxy titanium | 7.2 | 30 |

| | Preparation of dispersion Second dispersion | | | | | |
|---|---|---|---|---|---|---|
| | First dispersion [parts] | Titanium alkoxide | | Alcohol | | Holding time [Minutes] |
| | | Species | Amount [parts] | Species | Amount [parts] | |
| Example 201 | 137.2 | Tetrabutoxy titanium | 0.45 | Butanol | 4.05 | 30 |
| Comparative Example 201 | 137.2 | Tetrabutoxy titanium | 0.45 | Butanol | 4.05 | 30 |
| Comparative Example 202 | 137.2 | Tetrabutoxy titanium | 0.45 | Butanol | 4.05 | 30 |
| Comparative Example 203 | 137.2 | Tetrabutoxy titanium | 0.45 | Butanol | 4.05 | 30 |
| Comparative Example 204 | 137.2 | Tetrabutoxy titanium | 0.45 | Butanol | 4.05 | 30 |
| Comparative Example 205 | 137.2 | Tetrabutoxy titanium | 0.45 | Butanol | 4.05 | 30 |
| Comparative Example 206 | 137.2 | Tetrabutoxy titanium | 0.45 | Butanol | 4.05 | 30 |
| Example 202 | 137.2 | Tetrabutoxy titanium | 0.45 | Butanol | 4.05 | 30 |
| Example 203 | 137.2 | Tetrabutoxy titanium | 0.45 | Butanol | 4.05 | 30 |
| Example 204 | 137.2 | Tetrabutoxy titanium | 0.45 | Butanol | 4.05 | 30 |
| Example 205 | 137.2 | Tetrabutoxy titanium | 0.45 | Butanol | 4.05 | 30 |
| Example 206 | 137.2 | Tetrabutoxy titanium | 0.45 | Butanol | 4.05 | 30 |
| Example 207 | 137.2 | Tetrabutoxy titanium | 0.45 | Butanol | 4.05 | 30 |
| Example 208 | 137.2 | Tetrabutoxy titanium | 0.45 | Butanol | 4.05 | 30 |

| | Surface treatment | | | | |
|---|---|---|---|---|---|
| | Solvent removal Treatment atmosphere | Treatment atmosphere | Organometallic compound | | Heat treatment |
| | | | Species | Amount [parts] | Temperature [° C.] | Time [Minutes] |
| Example 201 | Supercritical carbon dioxide | | —(No second layer) | | 380 | 60 |
| Comparative Example 201 | Supercritical carbon dioxide | | —(No second layer) | | 380 | 60 |
| Comparative Example 202 | Supercritical carbon dioxide | | —(No second layer) | | 380 | 60 |
| Comparative Example 203 | Supercritical carbon dioxide | | —(No second layer) | | 380 | 60 |
| Comparative Example 204 | Supercritical carbon dioxide | | —(No second layer) | | 160 | 60 |
| Comparative Example 205 | Supercritical carbon dioxide | | —(No second layer) | | 600 | 60 |
| Comparative Example 206 | Supercritical carbon dioxide | | —(No second layer) | | — | — |
| Example 202 | Supercritical carbon dioxide | | —(No second layer) | | 380 | 60 |
| Example 203 | Supercritical carbon dioxide | | —(No second layer) | | 380 | 60 |
| Example 204 | Supercritical carbon dioxide | | —(No second layer) | | 380 | 60 |

TABLE 7-continued

| | | | | |
|---|---|---|---|---|
| Example 205 | Supercritical carbon dioxide | —(No second layer) | 380 | 60 |
| Example 206 | Supercritical carbon dioxide | —(No second layer) | 380 | 60 |
| Example 207 | Supercritical carbon dioxide | —(No second layer) | 380 | 60 |
| Example 208 | Supercritical carbon dioxide | —(No second layer) | 380 | 60 |

TABLE 8

| | Preparation of dispersion First dispersion | | | | | |
|---|---|---|---|---|---|---|
| | Alcohol | | Alkoxy silane | | Titanium alkoxide | |
| | Species | Amount [parts] | Species | Amount [parts] | Species | Amount [parts] |
| Example 301 | Methanol | 115.4 | Tetramethoxy silane | 7.2 | Tetrabutoxy titanium | 7.2 |
| Comparative Example 301 | Methanol | 115.4 | Tetramethoxy silane | 10.9 | Tetrabutoxy titanium | 3.4 |
| Comparative Example 302 | Methanol | 5 | Tetramethoxy silane | 7.2 | Tetrabutoxy titanium | 7.2 |
| Comparative Example 303 | Methanol | 450 | Tetramethoxy silane | 7.2 | Tetrabutoxy titanium | 7.2 |
| Comparative Example 304 | Methanol | 115.4 | Tetramethoxy silane | 7.2 | Tetrabutoxy titanium | 7.2 |
| Comparative Example 305 | Methanol | 115.4 | Tetramethoxy silane | 7.2 | Tetrabutoxy titanium | 7.2 |
| Comparative Example 306 | Methanol | 115.4 | Tetramethoxy silane | 7.2 | Tetrabutoxy titanium | 7.2 |
| Example 302 | Methanol | 115.4 | Tetramethoxy silane | 10.3 | Tetrabutoxy titanium | 4 |
| Example 303 | Methanol | 115.4 | Tetramethoxy silane | 0.3 | Tetrabutoxy titanium | 14 |
| Example 304 | Methanol | 346.2 | Tetramethoxy silane | 7.2 | Tetrabutoxy titanium | 7.2 |
| Example 305 | Methanol | 23.1 | Tetramethoxy silane | 7.2 | Tetrabutoxy titanium | 7.2 |
| Example 306 | Methanol | 115.4 | Tetramethoxy silane | 7.2 | Tetrabutoxy titanium | 7.2 |
| Example 307 | Methanol | 115.4 | Tetraethoxy silane | 7.2 | Tetrabutoxy titanium | 7.2 |
| Example 308 | Methanol | 115.4 | Tetramethoxy silane | 7.2 | Tetrapropoxy titanium | 7.2 |

| | Preparation of dispersion Second dispersion | | | | | | |
|---|---|---|---|---|---|---|---|
| | First dispersion Holding time [Minutes] | First dispersion [parts] | Titanium alkoxide | | Alcohol | | Holding time [Minutes] |
| | | | Species | Amount [Parts] | Species | Amount [Parts] | |
| Example 301 | 30 | 137.2 | Tetrabutoxy titanium | 0.45 | Butanol | 4.05 | 30 |
| Comparative Example 301 | 30 | 137.2 | Tetrabutoxy titanium | 0.45 | Butanol | 4.05 | 30 |
| Comparative Example 302 | 30 | 137.2 | Tetrabutoxy titanium | 0.45 | Butanol | 4.05 | 30 |
| Comparative Example 303 | 30 | 137.2 | Tetrabutoxy titanium | 0.45 | Butanol | 4.05 | 30 |
| Comparative Example 304 | 30 | 137.2 | Tetrabutoxy titanium | 0.45 | Butanol | 4.05 | 30 |
| Comparative Example 305 | 30 | 137.2 | Tetrabutoxy titanium | 0.45 | Butanol | 4.05 | 30 |
| Comparative Example 306 | 30 | 137.2 | Tetrabutoxy titanium | 0.45 | Butanol | 4.05 | 30 |
| Example 302 | 30 | 137.2 | Tetrabutoxy titanium | 0.45 | Butanol | 4.05 | 30 |
| Example 303 | 30 | 137.2 | Tetrabutoxy titanium | 0.45 | Butanol | 4.05 | 30 |
| Example 304 | 30 | 137.2 | Tetrabutoxy titanium | 0.45 | Butanol | 4.05 | 30 |
| Example 305 | 30 | 137.2 | Tetrabutoxy titanium | 0.45 | Butanol | 4.05 | 30 |

TABLE 8-continued

| | | | | | | | | |
|---|---|---|---|---|---|---|---|---|
| Example 306 | | 30 | 137.2 | Tetrabutoxy titanium | 0.45 | Butanol | 4.05 | 30 |
| Example 307 | | 30 | 137.2 | Tetrabutoxy titanium | 0.45 | Butanol | 4.05 | 30 |
| Example 308 | | 30 | 137.2 | Tetrabutoxy titanium | 0.45 | Butanol | 4.05 | 30 |

| | Solvent removal | Surface treatment | | | Heat treatment | |
|---|---|---|---|---|---|---|
| | | | Organometallic compound | | Tem- | |
| | Treatment atmosphere | Treatment atmosphere | Species | Amount [parts] | perature [° C.] | Time [Minutes] |
| Example 301 | Supercritical carbon dioxide | Supercritical carbon dioxide | Isobutyl trimethoxy silane | 4.5 | 380 | 60 |
| Comparative Example 301 | Supercritical carbon dioxide | Supercritical carbon dioxide | Isobutyl trimethoxy silane | 4.5 | 380 | 60 |
| Comparative Example 302 | Supercritical carbon dioxide | Supercritical carbon dioxide | Isobutyl trimethoxy silane | 4.5 | 380 | 60 |
| Comparative Example 303 | Supercritical carbon dioxide | Supercritical carbon dioxide | Isobutyl trimethoxy silane | 4.5 | 380 | 60 |
| Comparative Example 304 | Supercritical carbon dioxide | Supercritical carbon dioxide | Isobutyl trimethoxy silane | 4.5 | 160 | 60 |
| Comparative Example 305 | Supercritical carbon dioxide | Supercritical carbon dioxide | Isobutyl trimethoxy silane | 4.5 | 600 | 60 |
| Comparative Example 306 | Supercritical carbon dioxide | Supercritical carbon dioxide | Isobutyl trimethoxy silane | 4.5 | — | — |
| Example 302 | Supercritical carbon dioxide | Supercritical carbon dioxide | Isobutyl trimethoxy silane | 4.5 | 380 | 60 |
| Example 303 | Supercritical carbon dioxide | Supercritical carbon dioxide | Isobutyl trimethoxy silane | 4.5 | 380 | 60 |
| Example 304 | Supercritical carbon dioxide | Supercritical carbon dioxide | Isobutyl trimethoxy silane | 4.5 | 380 | 60 |
| Example 305 | Supercritical carbon dioxide | Supercritical carbon dioxide | Isobutyl trimethoxy silane | 4.5 | 380 | 60 |
| Example 306 | Supercritical carbon dioxide | Supercritical carbon dioxide | Isobutyl trimethoxy silane | 4.5 | 380 | 60 |
| Example 307 | Supercritical carbon dioxide | Supercritical carbon dioxide | Isobutyl trimethoxy silane | 4.5 | 380 | 60 |
| Example 308 | Supercritical carbon dioxide | Supercritical carbon dioxide | Isobutyl trimethoxy silane | 4.5 | 380 | 60 |

TABLE 9

| | Preparation of dispersion First dispersion | | | | | |
|---|---|---|---|---|---|---|
| | Alcohol | | Alkoxy silane | | Titanium alkoxide | |
| | Species | Amount [parts] | Species | Amount [parts] | Species | Amount [parts] |
| Example 309 | Methanol | 115.4 | Tetramethoxy silane | 7.2 | Tetrabutoxy titanium | 7.2 |
| Example 310 | Methanol | 115.4 | Tetramethoxy silane | 7.2 | Tetrabutoxy titanium | 7.2 |
| Example 311 | Methanol | 115.4 | Tetramethoxy silane | 7.2 | Tetrabutoxy titanium | 7.2 |
| Example 312 | Methanol | 115.4 | Tetramethoxy silane | 7.2 | Tetrabutoxy titanium | 7.2 |
| Example 313 | Methanol | 115.4 | Tetramethoxy silane | 7.2 | Tetrabutoxy titanium | 7.2 |
| Example 314 | Methanol | 115.4 | Tetramethoxy silane | 7.2 | Tetrabutoxy titanium | 7.2 |
| Example 315 | Methanol | 115.4 | Tetramethoxy silane | 7.2 | Tetrabutoxy titanium | 7.2 |
| Example 316 | Methanol | 115.4 | Tetramethoxy silane | 7.2 | Tetrabutoxy titanium | 7.2 |
| Example 317 | Methanol | 115.4 | Tetramethoxy silane | 7.2 | Tetrabutoxy titanium | 7.2 |
| Example 318 | Methanol | 115.4 | Tetramethoxy silane | 7.2 | Tetrabutoxy titanium | 7.2 |
| Example 319 | Methanol | 115.4 | Tetramethoxy silane | 7.2 | Tetrabutoxy titanium | 7.2 |
| Example 320 | Methanol | 115.4 | Tetramethoxy silane | 7.2 | Tetrabutoxy titanium | 7.2 |
| Example 321 | Methanol | 115.4 | Tetramethoxy silane | 7.2 | Tetrabutoxy titanium | 7.2 |
| Example 322 | Methanol | 115.4 | Tetramethoxy silane | 7.2 | Tetrabutoxy titanium | 7.2 |
| Example 323 | Methanol | 115.4 | Tetramethoxy silane | 7.2 | Tetrabutoxy titanium | 7.2 |

TABLE 9-continued

| | Preparation of dispersion | | | | | | |
|---|---|---|---|---|---|---|---|
| | First dispersion | Second dispersion | | | | | |
| | Holding time [Minutes] | First dispersion [parts] | Titanium alkoxide | | Alcohol | | Holding time [Minutes] |
| | | | Species | Amount [Parts] | Species | Amount [Parts] | |
| Example 309 | 30 | 137.2 | Tetrabutoxy titanium | 0.45 | Butanol | 4.05 | 30 |
| Example 310 | 30 | 137.2 | Tetrabutoxy titanium | 0.45 | Butanol | 4.05 | 30 |
| Example 311 | 30 | 137.2 | Tetrabutoxy titanium | 0.45 | Butanol | 4.05 | 30 |
| Example 312 | 30 | 137.2 | Tetrabutoxy titanium | 0.45 | Butanol | 4.05 | 30 |
| Example 313 | 30 | 137.2 | Tetrabutoxy titanium | 0.45 | Butanol | 4.05 | 30 |
| Example 314 | 30 | 137.2 | Tetrabutoxy titanium | 0.45 | Butanol | 4.05 | 30 |
| Example 315 | 30 | 137.2 | Tetrabutoxy titanium | 0.45 | Butanol | 4.05 | 30 |
| Example 316 | 30 | 137.2 | Tetrabutoxy titanium | 0.45 | Butanol | 4.05 | 30 |
| Example 317 | 30 | 137.2 | Tetrabutoxy titanium | 0.45 | Butanol | 4.05 | 30 |
| Example 318 | 30 | 137.2 | Tetrabutoxy titanium | 0.45 | Butanol | 4.05 | 30 |
| Example 319 | 30 | 137.2 | Tetrabutoxy titanium | 0.45 | Butanol | 4.05 | 30 |
| Example 320 | 30 | 137.2 | Tetrabutoxy titanium | 0.45 | Butanol | 4.05 | 30 |
| Example 321 | 30 | 137.2 | Tetrabutoxy titanium | 0.45 | Butanol | 4.05 | 30 |
| Example 322 | 30 | 137.2 | Tetrabutoxy titanium | 0.45 | Butanol | 4.05 | 30 |
| Example 323 | 30 | 137.2 | Tetrabutoxy titanium | 0.45 | Butanol | 4.05 | 30 |

| | Solvent removal Treatment atmosphere | Surface treatment | | | Heat treatment | |
|---|---|---|---|---|---|---|
| | | Treatment atmosphere | Organometallic compound | | Temperature [° C.] | Time [Minutes] |
| | | | Species | Amount [parts] | | |
| Example 309 | Supercritical carbon dioxide | Supercritical carbon dioxide | Hexyl trimethoxy silane | 4.5 | 380 | 60 |
| Example 310 | Supercritical carbon dioxide | Supercritical carbon dioxide | Decyl trimethoxy silane | 4.5 | 380 | 60 |
| Example 311 | Supercritical carbon dioxide | Supercritical carbon dioxide | Methyl trimethoxy silane | 4.5 | 380 | 60 |
| Example 312 | Supercritical carbon dioxide | Supercritical carbon dioxide | Dodecyl trimethoxy silane | 4.5 | 380 | 60 |
| Example 313 | Supercritical carbon dioxide | Supercritical carbon dioxide | Octadecyl trimethoxy silane | 4.5 | 380 | 60 |
| Example 314 | Supercritical carbon dioxide | Supercritical carbon dioxide | Octyl trichloro silane | 4.5 | 380 | 60 |
| Example 315 | Supercritical carbon dioxide | Supercritical carbon dioxide | Dimethoxy (methyl) (octyl) silane | 4.5 | 380 | 60 |
| Example 316 | Supercritical carbon dioxide | Supercritical carbon dioxide | Tri-n-hexyl chlorosilane | 4.5 | 380 | 60 |
| Example 317 | Supercritical carbon dioxide | Supercritical carbon dioxide | n-octyl dimethyl chlorosilane | 4.5 | 380 | 60 |
| Example 318 | Supercritical carbon dioxide | Supercritical carbon dioxide | Hexamethyl disilazane | 4.5 | 380 | 60 |
| Example 319 | Supercritical carbon dioxide | Supercritical carbon dioxide | Isopropyl triisostearoyltitanate | 4.5 | 380 | 60 |
| Example 320 | Supercritical carbon dioxide | Supercritical carbon dioxide | Acetoalkoxy aluminum diisopropylate | 4.5 | 380 | 60 |
| Example 321 | Supercritical carbon dioxide | Nitrogen (dry type) | Isobutyl trimethoxy silane | 4.5 | 380 | 60 |
| Example 322 | Supercritical carbon dioxide | Supercritical carbon dioxide | Isobutyl trimethoxy silane | 4.5 | 180 | 60 |
| Example 323 | Supercritical carbon dioxide | Supercritical carbon dioxide | Isobutyl trimethoxy silane | 4.5 | 500 | 60 |

TABLE 10

| | Characteristics of silica titania composite aerogel particle | | | | | UV-Vis characteristics | | | Performance evaluation | | |
|---|---|---|---|---|---|---|---|---|---|---|---|
| | Element ratio Si/Ti of base particle | BET specific area [m²/g] | Dp [nm] | Da [μm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 201 | 3.1 | 695 | 52 | 0.5 | 2.6 | 0.24 | 0.15 | 0.06 | G2 (B) | G2 (B) | A |
| Comparative | 7.1 | 795 | 42 | 0.6 | 2.9 | 0.24 | 0.16 | 0.06 | G2 (B) | G4 (D) | A |

TABLE 10-continued

| | Characteristics of silica titania composite aerogel particle | | | | | UV-Vis characteristics | | | Performance evaluation | | |
|---|---|---|---|---|---|---|---|---|---|---|---|
| | | BET | | | | | | | | | |
| | Element ratio Si/Ti of base particle | specific area [m²/g] | Dp [nm] | Da [µm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 201 | | | | | | | | | | | |
| Comparative Example 202 | 3.1 | 1302 | 11 | 5.1 | 13 | 0.25 | 0.15 | 0.07 | G2 (B) | G3 (C) | C |
| Comparative Example 203 | 3.1 | 178 | 111 | 0.2 | 1.1 | 0.25 | 0.14 | 0.07 | G4 (D) | G3 (C) | A |
| Comparative Example 204 | 3.1 | 695 | 52 | 0.5 | 2.6 | 0 | 0 | 0 | G2 (B) | G4 (D) | A |
| Comparative Example 205 | 3.1 | 695 | 52 | 0.5 | 2.6 | 0.01 | 0.01 | 0.01 | G2 (B) | G3 (C) | A |
| Comparative Example 206 | 3.1 | 695 | 52 | 0.5 | 2.6 | 0 | 0 | 0 | G2 (B) | G4 (D) | A |
| Example 202 | 5.7 | 695 | 52 | 0.5 | 2.6 | 0.24 | 0.15 | 0.06 | G2 (B) | G3 (C) | A |
| Example 203 | 0.05 | 395 | 72 | 0.5 | 2.6 | 0.25 | 0.15 | 0.06 | G2 (B) | G2 (B) | A |
| Example 204 | 3.1 | 220 | 80 | 0.1 | 1.6 | 0.24 | 0.15 | 0.06 | G3 (C) | G2 (B) | A |
| Example 205 | 3.1 | 1151 | 20 | 2.6 | 9.0 | 0.25 | 0.15 | 0.06 | G2 (B) | G2 (B) | B |
| Example 206 | 3.1 | 595 | 52 | 0.5 | 2.6 | 0.24 | 0.15 | 0.06 | G2 (B) | G2 (B) | A |
| Example 207 | 2.5 | 595 | 52 | 0.5 | 2.6 | 0.24 | 0.14 | 0.06 | G2 (B) | G2 (B) | A |
| Example 208 | 2.7 | 545 | 62 | 0.5 | 2.6 | 0.25 | 0.15 | 0.06 | G2 (B) | G2 (B) | A |

TABLE 11

| | Characteristics of silica titania composite aerogel particle | | | | | UV-Vis characteristics | | | Performance evaluation | | |
|---|---|---|---|---|---|---|---|---|---|---|---|
| | | BET | | | | | | | | | |
| | Element ratio Si/Ti of base particle | specific area [m²/g] | Dp [nm] | Da [µm] | GSDv | Absorbance at wavelength of 450 nm | Absorbance at wavelength of 600 nm | Absorbance at wavelength of 750 nm | Gas adsorptivity | Gas decomposability | Coarse particle index |
| Example 301 | 3.1 | 695 | 52 | 0.5 | 2.6 | 0.61 | 0.37 | 0.23 | G1 (A) | G1 (A) | A |
| Comparative Example 301 | 7.1 | 795 | 42 | 0.6 | 2.9 | 0.57 | 0.35 | 0.25 | G1 (A) | G4 (D) | A |
| Comparative Example 302 | 3.1 | 1302 | 16 | 4.6 | 13 | 0.60 | 0.38 | 0.23 | G1 (A) | G2 (B) | C |
| Comparative Example 303 | 3.1 | 178 | 111 | 0.2 | 1.1 | 0.60 | 0.36 | 0.24 | G4 (D) | G2 (B) | A |
| Comparative Example 304 | 3.1 | 695 | 52 | 0.5 | 2.6 | 0 | 0 | 0 | G1 (A) | G4 (D) | A |
| Comparative Example 305 | 3.1 | 695 | 52 | 0.5 | 2.6 | 0.01 | 0.01 | 0.01 | G1 (A) | G3 (C) | A |
| Comparative Example 306 | 3.1 | 695 | 52 | 0.5 | 2.6 | 0 | 0 | 0 | G1 (A) | G4 (D) | A |
| Example 302 | 5.7 | 700 | 52 | 0.5 | 2.5 | 0.61 | 0.39 | 0.24 | G1 (A) | G2 (B) | A |
| Example 303 | 0.05 | 400 | 72 | 0.5 | 2.5 | 0.70 | 0.38 | 0.25 | G2 (B) | G1 (A) | A |
| Example 304 | 3.1 | 220 | 82 | 0.1 | 1.6 | 0.60 | 0.35 | 0.22 | G2 (B) | G1 (A) | A |
| Example 305 | 3.2 | 1150 | 22 | 2.8 | 9.8 | 0.61 | 0.38 | 0.23 | G1 (A) | G1 (A) | B |
| Example 306 | 3.0 | 600 | 52 | 0.5 | 2.5 | 0.62 | 0.38 | 0.25 | G1 (A) | G1 (A) | A |
| Example 307 | 2.4 | 600 | 52 | 0.5 | 2.5 | 0.61 | 0.39 | 0.24 | G1 (A) | G1 (A) | A |
| Example 308 | 2.6 | 550 | 62 | 0.5 | 2.5 | 0.60 | 0.37 | 0.23 | G1 (A) | G1 (A) | A |

TABLE 12

| | Characteristics of silica titania composite aerogel particle | | | | | UV-Vis characteristics | |
|---|---|---|---|---|---|---|---|
| | Element ratio Si/Ti of base particle | BET specific area [m²/g] | Dp [nm] | Da [µm] | GSDv | Absorbance at wavelength of 450 nm | Absorbance at wavelength of 600 nm |
| Example 309 | 3.0 | 605 | 52 | 0.5 | 2.5 | 0.60 | 0.38 |
| Example 310 | 3.0 | 610 | 52 | 0.5 | 2.5 | 0.62 | 0.38 |
| Example 311 | 3.0 | 590 | 52 | 0.5 | 2.5 | 0.62 | 0.38 |
| Example 312 | 3.0 | 590 | 52 | 0.5 | 2.5 | 0.61 | 0.37 |
| Example 313 | 3.0 | 600 | 52 | 0.5 | 2.5 | 0.60 | 0.38 |

TABLE 12-continued

| | | | | | | | |
|---|---|---|---|---|---|---|---|
| Example 314 | 3.0 | 600 | 52 | 0.5 | 2.5 | 0.60 | 0.38 |
| Example 315 | 3.0 | 595 | 52 | 0.5 | 2.5 | 0.61 | 0.40 |
| Example 316 | 3.0 | 610 | 52 | 0.5 | 2.5 | 0.60 | 0.41 |
| Example 317 | 3.0 | 600 | 52 | 0.5 | 2.5 | 0.62 | 0.38 |
| Example 318 | 3.0 | 600 | 52 | 0.5 | 2.5 | 0.60 | 0.39 |
| Example 319 | 3.0 | 600 | 52 | 0.5 | 2.5 | 0.62 | 0.38 |
| Example 320 | 3.0 | 600 | 52 | 0.5 | 2.5 | 0.60 | 0.37 |
| Example 321 | 3.0 | 500 | 52 | 0.7 | 2.5 | 0.60 | 0.37 |
| Example 322 | 3.0 | 500 | 52 | 0.5 | 2.5 | 0.23 | 0.15 |
| Example 323 | 3.0 | 650 | 52 | 0.5 | 2.5 | 0.21 | 0.11 |

| | UV-Vis characteristics | Performance evaluation | | |
|---|---|---|---|---|
| | Absorbance at wavelength of 750 nm | Gas adsorptivity | Gas decomposability | Coarse particle index |
| Example 309 | 0.24 | G1 (A) | G1 (A) | A |
| Example 310 | 0.24 | G1 (A) | G1 (A) | A |
| Example 311 | 0.20 | G2 (B) | G2 (B) | A |
| Example 312 | 0.25 | G2 (B) | G2 (B) | A |
| Example 313 | 0.23 | G2 (B) | G2 (B) | A |
| Example 314 | 0.24 | G2 (B) | G2 (B) | A |
| Example 315 | 0.25 | G2 (B) | G2 (B) | A |
| Example 316 | 0.23 | G2 (B) | G2 (B) | A |
| Example 317 | 0.21 | G2 (B) | G2 (B) | A |
| Example 318 | 0.24 | G2 (B) | G2 (B) | A |
| Example 319 | 0.19 | G2 (B) | G2 (B) | A |
| Example 320 | 0.25 | G2 (B) | G2 (B) | A |
| Example 321 | 0.25 | G3 (C) | G1 (A) | A |
| Example 322 | 0.12 | G2 (B) | G2 (B) | A |
| Example 323 | 0.09 | G2 (B) | G2 (B) | A |

Details of the organometallic compounds indicated in Table 9 are as described below.
Isopropyl triisostearoyl titanate: PLAINACT TTS produced by Ajinomoto Co., Inc.
Acetoalkoxy aluminum diisopropylate: PLAINACT AL-M produced by Ajinomoto Co., Inc.

From the results of the performance evaluations illustrated in Tables 10 to 12, it is understood that the present examples are excellent in the photocatalytic activity in the visible light region as compared with the comparative examples. In addition, it is understood that the amount of coarse particles is small in the present examples.

TABLE 13

| | Preparation of dispersion First dispersion | | | | | | |
|---|---|---|---|---|---|---|---|
| | Alcohol | | Alkoxy silane | | Titanium alkoxide | | |
| | Species | Amount [parts] | Species | Amount [parts] | Species | Amount [parts] | Holding time [Minutes] |
| Example 411 | Methanol | 115.4 | Tetramethoxy silane | 7.2 | Tetrabutoxy titanium | 7.2 | 30 |
| Example 412 | Methanol | 346.2 | Tetramethoxy silane | 7.2 | Tetrabutoxy titanium | 7.2 | 30 |
| Example 413 | Methanol | 23.1 | Tetramethoxy silane | 7.2 | Tetrabutoxy titanium | 7.2 | 30 |
| Example 414 | Methanol | 115.4 | Tetramethoxy silane | 20.2 | Tetrabutoxy titanium | 7.2 | 30 |
| Example 415 | Methanol | 115.4 | Tetramethoxy silane | 4.3 | Tetrabutoxy titanium | 7.2 | 30 |
| Comparative Example 411 | Methanol | 115.4 | Tetramethoxy silane | 10.9 | Tetrabutoxy titanium | 3.4 | 30 |
| Comparative Example 412 | Methanol | 115.4 | Tetramethoxy silane | 7.2 | Tetrabutoxy titanium | 7.2 | 30 |
| Comparative Example 413 | Methanol | 115.4 | Tetramethoxy silane | 7.2 | Tetrabutoxy titanium | 7.2 | 30 |
| Comparative Example 414 | Methanol | 5 | Tetramethoxy silane | 7.2 | Tetrabutoxy titanium | 7.2 | 30 |
| Comparative Example 415 | Methanol | 450 | Tetramethoxy silane | 7.2 | Tetrabutoxy titanium | 7.2 | 30 |
| Comparative Example 416 | Methanol | 115.4 | Tetramethoxy silane | 7.2 | Tetrabutoxy titanium | 7.2 | 30 |
| Example 416 | Methanol | 115.4 | Tetramethoxy silane | 7.2 | Tetrabutoxy titanium | 7.2 | 30 |
| Example 417 | Methanol | 115.4 | Tetramethoxy silane | 7.2 | Tetrabutoxy titanium | 7.2 | 30 |
| Example 401 | Methanol | 115.4 | Tetramethoxy silane | 7.2 | Tetrabutoxy titanium | 7.2 | 30 |
| Comparative Example 401 | Methanol | 115.4 | Tetramethoxy silane | 7.2 | Tetrabutoxy titanium | 0 | 30 |
| Comparative Example 402 | Methanol | 115.4 | Tetramethoxy silane | 7.2 | Tetrabutoxy titanium | 3.6 | 30 |
| Comparative Example 403 | Methanol | 450 | Tetramethoxy silane | 7.2 | Tetrabutoxy titanium | 7.2 | 30 |
| Comparative Example 404 | Methanol | 5 | Tetramethoxy silane | 7.2 | Tetrabutoxy titanium | 7.2 | 30 |
| Comparative Example 405 | Methanol | 115.4 | Tetramethoxy silane | 7.2 | Tetrabutoxy titanium | 7.2 | 30 |
| Comparative Example 406 | Methanol | 115.4 | Tetramethoxy silane | 7.2 | Tetrabutoxy titanium | 7.2 | 30 |
| Example 402 | Methanol | 115.4 | Tetramethoxy silane | 10.3 | Tetrabutoxy titanium | 4 | 30 |
| Example 403 | Methanol | 115.4 | Tetramethoxy silane | 0.3 | Tetrabutoxy titanium | 14 | 30 |
| Example 404 | Methanol | 346.2 | Tetramethoxy silane | 7.2 | Tetrabutoxy titanium | 7.2 | 30 |
| Example 405 | Methanol | 23.1 | Tetramethoxy silane | 7.2 | Tetrabutoxy titanium | 7.2 | 30 |
| Example 406 | Methanol | 115.4 | Tetramethoxy silane | 7.2 | Tetrabutoxy titanium | 7.2 | 30 |
| Example 407 | Methanol | 115.4 | Tetramethoxy silane | 7.2 | Tetrabutoxy titanium | 7.2 | 30 |
| Example 408 | Methanol | 115.4 | Tetramethoxy silane | 7.2 | Tetrabutoxy titanium | 7.2 | 30 |

TABLE 13-continued

| | | | | | | |
|---|---|---|---|---|---|---|
| Example 421 | Methanol | 115.4 | Tetramethoxy silane | 7.2 | Tetrabutoxy titanium | 7.2 | 30 |
| Example 422 | Methanol | 115.4 | Tetramethoxy silane | 7.2 | Tetrabutoxy titanium | 7.2 | 30 |
| Example 423 | Methanol | 115.4 | Tetramethoxy silane | 7.2 | Tetrabutoxy titanium | 7.2 | 30 |
| Example 424 | Methanol | 115.4 | Tetramethoxy silane | 7.2 | Tetrabutoxy titanium | 7.2 | 30 |
| Example 425 | Methanol | 115.4 | Tetramethoxy silane | 7.2 | Tetrabutoxy titanium | 7.2 | 30 |
| Example 426 | Methanol | 115.4 | Tetramethoxy silane | 7.2 | Tetrabutoxy titanium | 7.2 | 30 |
| Example 427 | Methanol | 115.4 | Tetramethoxy silane | 7.2 | Tetrabutoxy titanium | 7.2 | 30 |
| Example 428 | Methanol | 115.4 | Tetramethoxy silane | 7.2 | Tetrabutoxy titanium | 7.2 | 30 |
| Example 429 | Methanol | 115.4 | Tetramethoxy silane | 7.2 | Tetrabutoxy titanium | 7.2 | 30 |
| Example 430 | Methanol | 115.4 | Tetramethoxy silane | 7.2 | Tetrabutoxy titanium | 7.2 | 30 |
| Example 431 | Methanol | 115.4 | Tetramethoxy silane | 7.2 | Tetrabutoxy titanium | 7.2 | 30 |
| Example 432 | Methanol | 115.4 | Tetramethoxy silane | 7.2 | Tetrabutoxy titanium | 7.2 | 30 |
| Example 433 | Methanol | 115.4 | Tetramethoxy silane | 7.2 | Tetrabutoxy titanium | 7.2 | 30 |
| Example 434 | Methanol | 115.4 | Tetramethoxy silane | 7.2 | Tetrabutoxy titanium | 7.2 | 30 |
| Example 435 | Methanol | 115.4 | Tetramethoxy silane | 7.2 | Tetrabutoxy titanium | 7.2 | 30 |
| Example 436 | Methanol | 115.4 | Tetramethoxy silane | 7.2 | Tetrabutoxy titanium | 7.2 | 30 |

Preparation of dispersion
Second dispersion

| | First dispersion [parts] | Titanium alkoxide Species | Amount [Parts] | Alcohol Species | Amount [Parts] | Holding time [Minutes] |
|---|---|---|---|---|---|---|
| Example 411 | | Intermediate layer is not formed | | | | |
| Example 412 | | Intermediate layer is not formed | | | | |
| Example 413 | | Intermediate layer is not formed | | | | |
| Example 414 | | Intermediate layer is not formed | | | | |
| Example 415 | | Intermediate layer is not formed | | | | |
| Comparative Example 411 | | Intermediate layer is not formed | | | | |
| Comparative Example 412 | | Intermediate layer is not formed | | | | |
| Comparative Example 413 | | Intermediate layer is not formed | | | | |
| Comparative Example 414 | | Intermediate layer is not formed | | | | |
| Comparative Example 415 | | Intermediate layer is not formed | | | | |
| Comparative Example 416 | | Intermediate layer is not formed | | | | |
| Example 416 | | Intermediate layer is not formed | | | | |
| Example 417 | | Intermediate layer is not formed | | | | |
| Example 401 | 137.2 | Tetrabutoxy titanium | 0.45 | Butanol | 4.05 | 30 |
| Comparative Example 401 | | Intermediate layer is not formed | | | | |
| Comparative Example 402 | 137.2 | Tetrabutoxy titanium | 0.45 | Butanol | 4.05 | 30 |
| Comparative Example 403 | 137.2 | Tetrabutoxy titanium | 0.45 | Butanol | 4.05 | 30 |
| Comparative Example 404 | 137.2 | Tetrabutoxy titanium | 0.45 | Butanol | 4.05 | 30 |
| Comparative Example 405 | 137.2 | Tetrabutoxy titanium | 0.45 | Butanol | 4.05 | 30 |
| Comparative Example 406 | 137.2 | Tetrabutoxy titanium | 0.45 | Butanol | 4.05 | 30 |
| Example 402 | 137.2 | Tetrabutoxy titanium | 0.45 | Butanol | 4.05 | 30 |
| Example 403 | 137.2 | Tetrabutoxy titanium | 0.45 | Butanol | 4.05 | 30 |
| Example 404 | 137.2 | Tetrabutoxy titanium | 0.45 | Butanol | 4.05 | 30 |
| Example 405 | 137.2 | Tetrabutoxy titanium | 0.45 | Butanol | 4.05 | 30 |
| Example 406 | 137.2 | Tetrabutoxy titanium | 0.45 | Butanol | 4.05 | 30 |
| Example 407 | 137.2 | Tetrabutoxy titanium | 0.45 | Butanol | 4.05 | 30 |
| Example 408 | 137.2 | Tetrabutoxy titanium | 0.45 | Butanol | 4.05 | 30 |
| Example 421 | 137.2 | Tetrabutoxy titanium | 0.45 | Butanol | 4.05 | 30 |
| Example 422 | 137.2 | Tetrabutoxy titanium | 0.45 | Butanol | 4.05 | 30 |
| Example 423 | 137.2 | Tetrabutoxy titanium | 0.45 | Butanol | 4.05 | 30 |
| Example 424 | 137.2 | Tetrabutoxy titanium | 0.45 | Butanol | 4.05 | 30 |
| Example 425 | 137.2 | Tetrabutoxy titanium | 0.45 | Butanol | 4.05 | 30 |
| Example 426 | 137.2 | Tetrabutoxy titanium | 0.45 | Butanol | 4.05 | 30 |
| Example 427 | 137.2 | Tetrabutoxy titanium | 0.45 | Butanol | 4.05 | 30 |
| Example 428 | 137.2 | Tetrabutoxy titanium | 0.45 | Butanol | 4.05 | 30 |
| Example 429 | 137.2 | Tetrabutoxy titanium | 0.45 | Butanol | 4.05 | 30 |
| Example 430 | 137.2 | Tetrabutoxy titanium | 0.45 | Butanol | 4.05 | 30 |
| Example 431 | 137.2 | Tetrabutoxy titanium | 0.45 | Butanol | 4.05 | 30 |
| Example 432 | 137.2 | Tetrabutoxy titanium | 0.45 | Butanol | 4.05 | 30 |
| Example 433 | 137.2 | Tetrabutoxy titanium | 0.45 | Butanol | 4.05 | 30 |
| Example 434 | 137.2 | Tetrabutoxy titanium | 0.45 | Butanol | 4.05 | 30 |
| Example 435 | 137.2 | Tetrabutoxy titanium | 0.45 | Butanol | 4.05 | 30 |
| Example 436 | 137.2 | Tetrapropoxy titanium | 0.45 | Butanol | 4.05 | 30 |

Solvent removal
Treatment atmosphere

| | |
|---|---|
| Example 411 | Supercritical carbon dioxide |
| Example 412 | Supercritical carbon dioxide |
| Example 413 | Supercritical carbon dioxide |
| Example 414 | Supercritical carbon dioxide |
| Example 415 | Supercritical carbon dioxide |
| Comparative Example 411 | Supercritical carbon dioxide |
| Comparative Example 412 | Supercritical carbon dioxide |
| Comparative Example 413 | Supercritical carbon dioxide |

TABLE 13-continued

| | |
|---|---|
| Comparative Example 414 | Supercritical carbon dioxide |
| Comparative Example 415 | Supercritical carbon dioxide |
| Comparative Example 416 | Supercritical carbon dioxide |
| Example 416 | Supercritical carbon dioxide |
| Example 417 | Supercritical carbon dioxide |
| Example 401 | Supercritical carbon dioxide |
| Comparative Example 401 | Supercritical carbon dioxide |
| Comparative Example 402 | Supercritical carbon dioxide |
| Comparative Example 403 | Supercritical carbon dioxide |
| Comparative Example 404 | Supercritical carbon dioxide |
| Comparative Example 405 | Supercritical carbon dioxide |
| Comparative Example 406 | Supercritical carbon dioxide |
| Example 402 | Supercritical carbon dioxide |
| Example 403 | Supercritical carbon dioxide |
| Example 404 | Supercritical carbon dioxide |
| Example 405 | Supercritical carbon dioxide |
| Example 406 | Supercritical carbon dioxide |
| Example 407 | Supercritical carbon dioxide |
| Example 408 | Supercritical carbon dioxide |
| Example 421 | Supercritical carbon dioxide |
| Example 422 | Supercritical carbon dioxide |
| Example 423 | Supercritical carbon dioxide |
| Example 424 | Supercritical carbon dioxide |
| Example 425 | Supercritical carbon dioxide |
| Example 426 | Supercritical carbon dioxide |
| Example 427 | Supercritical carbon dioxide |
| Example 428 | Supercritical carbon dioxide |
| Example 429 | Supercritical carbon dioxide |
| Example 430 | Supercritical carbon dioxide |
| Example 431 | Supercritical carbon dioxide |
| Example 432 | Supercritical carbon dioxide |
| Example 433 | Supercritical carbon dioxide |
| Example 434 | Supercritical carbon dioxide |
| Example 435 | Supercritical carbon dioxide |
| Example 436 | Supercritical carbon dioxide |

| | Surface treatment | | | Heat treatment | |
|---|---|---|---|---|---|
| | | Organometallic compound | | | |
| | Treatment atmosphere | Species | Amount [parts] | Temperature [° C.] | Time [Minutes] |
| Example 411 | Supercritical carbon dioxide | Isobutyl trimethoxy silane | 4.5 | 380 | 60 |
| Example 412 | Supercritical carbon dioxide | Isobutyl trimethoxy silane | 4.5 | 380 | 60 |
| Example 413 | Supercritical carbon dioxide | Isobutyl trimethoxy silane | 4.5 | 380 | 60 |
| Example 414 | Supercritical carbon dioxide | Isobutyl trimethoxy silane | 4.5 | 380 | 60 |
| Example 415 | Supercritical carbon dioxide | Isobutyl trimethoxy silane | 4.5 | 380 | 60 |
| Comparative Example 411 | Supercritical carbon dioxide | Isobutyl trimethoxy silane | 4.5 | 380 | 60 |
| Comparative Example 412 | Supercritical carbon dioxide | Isobutyl trimethoxy silane | 4.5 | 160 | 60 |
| Comparative Example 413 | Supercritical carbon dioxide | Isobutyl trimethoxy silane | 4.5 | 600 | 60 |
| Comparative Example 414 | Supercritical carbon dioxide | Isobutyl trimethoxy silane | 4.5 | 380 | 60 |
| Comparative Example 415 | Supercritical carbon dioxide | Isobutyl trimethoxy silane | 4.5 | 380 | 60 |
| Comparative Example 416 | Supercritical carbon dioxide | Isobutyl trimethoxy silane | 4.5 | — | — |
| Example 416 | Supercritical carbon dioxide | Isobutyl trimethoxy silane | 4.5 | 500 | 60 |
| Example 417 | Supercritical carbon dioxide | Isobutyl trimethoxy silane | 4.5 | 250 | 60 |
| Example 401 | Supercritical carbon dioxide | Isobutyl trimethoxy silane | 4.5 | 380 | 60 |
| Comparative Example 401 | Supercritical carbon dioxide | Isobutyl trimethoxy silane | 4.5 | 380 | 60 |
| Comparative Example 402 | Supercritical carbon dioxide | Isobutyl trimethoxy silane | 4.5 | 380 | 60 |
| Comparative Example 403 | Supercritical carbon dioxide | Isobutyl trimethoxy silane | 4.5 | 380 | 60 |
| Comparative Example 404 | Supercritical carbon dioxide | Isobutyl trimethoxy silane | 4.5 | 380 | 60 |
| Comparative Example 405 | Supercritical carbon dioxide | Isobutyl trimethoxy silane | 4.5 | 600 | 60 |
| Comparative Example 406 | Supercritical carbon dioxide | Isobutyl trimethoxy silane | 4.5 | 160 | 60 |
| Example 402 | Supercritical carbon dioxide | Isobutyl trimethoxy silane | 4.5 | 380 | 60 |
| Example 403 | Supercritical carbon dioxide | Isobutyl trimethoxy silane | 4.5 | 380 | 60 |
| Example 404 | Supercritical carbon dioxide | Isobutyl trimethoxy silane | 4.5 | 380 | 60 |
| Example 405 | Supercritical carbon dioxide | Isobutyl trimethoxy silane | 4.5 | 380 | 60 |
| Example 406 | Supercritical carbon dioxide | Isobutyl trimethoxy silane | 4.5 | 380 | 60 |
| Example 407 | Supercritical carbon dioxide | Isobutyl trimethoxy silane | 4.5 | 380 | 60 |
| Example 408 | Supercritical carbon dioxide | Isobutyl trimethoxy silane | 4.5 | 380 | 60 |
| Example 421 | Supercritical carbon dioxide | Hexyl trimethoxy silane | 4.5 | 380 | 60 |
| Example 422 | Supercritical carbon dioxide | Decyl trimethoxy silane | 4.5 | 380 | 60 |
| Example 423 | Supercritical carbon dioxide | Methyl trimethoxy silane | 4.5 | 380 | 60 |
| Example 424 | Supercritical carbon dioxide | Dodecyl trimethoxy silane | 4.5 | 380 | 60 |
| Example 425 | Supercritical carbon dioxide | Octadecyl trimethoxy silane | 4.5 | 380 | 60 |
| Example 426 | Supercritical carbon dioxide | Octyl trimethoxy silane | 4.5 | 380 | 60 |
| Example 427 | Supercritical carbon dioxide | Dimethoxy (methyl) (octyl) silane | 4.5 | 380 | 60 |
| Example 428 | Supercritical carbon dioxide | Tri-n-hexyl chlorosilane | 4.5 | 380 | 60 |
| Example 429 | Supercritical carbon dioxide | n-octyl dimethyl chlorosilane | 4.5 | 380 | 60 |
| Example 430 | Supercritical carbon dioxide | Hexamethyl disilazane | 4.5 | 380 | 60 |

TABLE 13-continued

| | | | | | |
|---|---|---|---|---|---|
| Example 431 | Supercritical carbon dioxide | Isopropyl triisostearoyltitanate | 4.5 | 380 | 60 |
| Example 432 | Supercritical carbon dioxide | Acetoalkoxy aluminum diisopropylate | 4.5 | 380 | 60 |
| Example 433 | Nitrogen (dry type) | Isobutyl trimethoxy silane | 4.5 | 380 | 60 |
| Example 434 | Supercritical carbon dioxide | Isobutyl trimethoxy silane | 4.5 | 180 | 60 |
| Example 435 | Supercritical carbon dioxide | Isobutyl trimethoxy silane | 4.5 | 500 | 60 |
| Example 436 | Supercritical carbon dioxide | Isobutyl trimethoxy silane | 4.5 | 380 | 60 |

TABLE 14

| | Particle characteristics | | | | | |
|---|---|---|---|---|---|---|
| | Element ratio Si/Ti of base particle | BET specific area [m²/g] | Element ratio C/Ti of surface | Da [nm] | Dp [μm] | GSDv |
| Example 411 | 3.1 | 1050 | 3.1 | 24 | 0.2 | 2.3 |
| Example 412 | 3.1 | 1184 | 4.3 | 14 | 0.3 | 8.1 |
| Example 413 | 3.1 | 215 | 3.3 | 85 | 2.7 | 5.3 |
| Example 414 | 1.1 | 1043 | 2.3 | 23 | 0.5 | 3.2 |
| Example 415 | 5.1 | 318 | 4.7 | 83 | 2.5 | 4.8 |
| Comparative Example 411 | 7.1 | 783 | 4.9 | 28 | 1.6 | 1.7 |
| Comparative Example 412 | 3.1 | 242 | 5.8 | 56 | 0.9 | 2.3 |
| Comparative Example 413 | 3.1 | 457 | 1.7 | 43 | 1.2 | 3.8 |
| Comparative Example 414 | 3.1 | 1370 | 2.3 | 2.1 | 0.15 | 14.0 |
| Comparative Example 415 | 3.1 | 180 | 4.7 | 96 | 3.2 | 11.0 |
| Comparative Example 416 | 3.1 | 1098 | 3.3 | 32 | 0.35 | 5.1 |
| Example 416 | 3.1 | 558 | 2.1 | 48 | 1.8 | 7.2 |
| Example 417 | 3.1 | 340 | 5.0 | 35 | 0.5 | 5.1 |
| Example 401 | 3.1 | 1120 | 4.6 | 56 | 0.9 | 2.3 |
| Comparative Example 401 | 0 | 980 | — | 56 | 0.9 | 2.3 |
| Comparative Example 402 | 6.2 | 540 | 4.5 | 56 | 0.9 | 2.3 |
| Comparative Example 403 | 3.1 | 190 | 4.8 | 96 | 3.2 | 11.3 |
| Comparative Example 404 | 3.1 | 1320 | 2.1 | 1.3 | 0.12 | 1.8 |
| Comparative Example 405 | 3.1 | 549 | 1.9 | 48 | 2.3 | 1.8 |
| Comparative Example 406 | 3.1 | 298 | 5.5 | 64 | 0.9 | 2.5 |
| Example 402 | 5.7 | 890 | 4.6 | 78 | 1.2 | 4.1 |
| Example 403 | 0.05 | 321 | 2.7 | 79 | 2.3 | 2.3 |
| Example 404 | 3.1 | 220 | 4.8 | 83 | 2.8 | 9.7 |
| Example 405 | 3.1 | 1150 | 2.2 | 21 | 0.1 | 1.6 |
| Example 406 | 3.1 | 1180 | 2.2 | 15 | 0.9 | 2.3 |
| Example 407 | 2.4 | 976 | 3.1 | 32 | 2.2 | 3.8 |
| Example 408 | 2.6 | 890 | 2.4 | 58 | 2.3 | 2.3 |
| Example 421 | 3.1 | 659 | 4.4 | 35 | 0.9 | 2.3 |
| Example 422 | 3.1 | 570 | 4.7 | 24 | 0.9 | 2.3 |
| Example 423 | 3.1 | 977 | 3.2 | 78 | 0.9 | 2.3 |
| Example 424 | 3.1 | 414 | 4.6 | 87 | 0.9 | 2.3 |
| Example 425 | 3.1 | 346 | 4.9 | 45 | 0.9 | 2.3 |
| Example 426 | 3.1 | 546 | 3.8 | 44 | 0.9 | 2.3 |
| Example 427 | 3.1 | 1010 | 2.9 | 21 | 0.9 | 2.3 |
| Example 428 | 3.1 | 780 | 3.5 | 35 | 0.9 | 2.3 |
| Example 429 | 3.1 | 675 | 4.1 | 67 | 0.9 | 2.3 |
| Example 430 | 3.1 | 965 | 2.7 | 71 | 0.9 | 2.3 |
| Example 431 | 3.1 | 450 | 2.3 | 56 | 1.8 | 2.3 |
| Example 432 | 3.1 | 659 | 3.2 | 66 | 2.7 | 5.3 |
| Example 433 | 3.1 | 560 | 2.7 | 73 | 2.4 | 4.2 |
| Example 434 | 3.1 | 239 | 4.9 | 41 | 0.98 | 4.1 |
| Example 435 | 3.1 | 605 | 2.1 | 23 | 0.9 | 7.6 |
| Example 436 | 3.1 | 833 | 3.8 | 83 | 2.0 | 7.3 |

| | UV-Vis characteristics | | |
|---|---|---|---|
| | Absorbance at wavelength of 450 nm | Absorbance at wavelength of 600 nm | Absorbance at wavelength of 750 nm |
| Example 411 | 0.24 | 0.15 | 0.06 |
| Example 412 | 0.23 | 0.16 | 0.07 |
| Example 413 | 0.31 | 0.20 | 0.06 |
| Example 414 | 0.25 | 0.15 | 0.08 |
| Example 415 | 0.23 | 0.17 | 0.06 |
| Comparative Example 411 | 0.24 | 0.16 | 0.06 |
| Comparative Example 412 | 0 | 0 | 0 |
| Comparative Example 413 | 0.01 | 0.01 | 0.01 |
| Comparative Example 414 | 0.23 | 0.14 | 0.05 |
| Comparative Example 415 | 0.24 | 0.15 | 0.06 |
| Comparative Example 416 | 0 | 0 | 0 |

TABLE 14-continued

| | | | |
|---|---|---|---|
| Example 416 | 0.25 | 0.17 | 0.05 |
| Example 417 | 0.21 | 0.16 | 0.06 |
| Example 401 | 0.25 | 0.16 | 0.06 |
| Comparative Example 401 | 0.23 | 0.14 | 0.06 |
| Comparative Example 402 | 0.25 | 0.15 | 0.05 |
| Comparative Example 403 | 0.26 | 0.14 | 0.05 |
| Comparative Example 404 | 0.25 | 0.16 | 0.06 |
| Comparative Example 405 | 0.01 | 0.01 | 0.01 |
| Comparative Example 406 | 0 | 0 | 0 |
| Example 402 | 0.24 | 0.15 | 0.05 |
| Example 403 | 0.24 | 0.17 | 0.05 |
| Example 404 | 0.25 | 0.16 | 0.06 |
| Example 405 | 0.24 | 0.17 | 0.06 |
| Example 406 | 0.26 | 0.16 | 0.06 |
| Example 407 | 0.25 | 0.16 | 0.07 |
| Example 408 | 0.25 | 0.16 | 0.07 |
| Example 421 | 0.25 | 0.14 | 0.07 |
| Example 422 | 0.26 | 0.16 | 0.07 |
| Example 423 | 0.28 | 0.16 | 0.08 |
| Example 424 | 0.26 | 0.14 | 0.07 |
| Example 425 | 0.25 | 0.15 | 0.07 |
| Example 426 | 0.26 | 0.16 | 0.05 |
| Example 427 | 0.26 | 0.16 | 0.07 |
| Example 428 | 0.27 | 0.16 | 0.07 |
| Example 429 | 0.26 | 0.15 | 0.07 |
| Example 430 | 0.27 | 0.16 | 0.08 |
| Example 431 | 0.26 | 0.16 | 0.07 |
| Example 432 | 0.26 | 0.16 | 0.06 |
| Example 433 | 0.26 | 0.16 | 0.07 |
| Example 434 | 0.25 | 0.16 | 0.07 |
| Example 435 | 0.25 | 0.16 | 0.07 |
| Example 436 | 0.26 | 0.16 | 0.07 |

| | Test results of Performance evaluation | | | | Performance evaluation | | |
|---|---|---|---|---|---|---|---|
| | S1 | S2 | Gas adsorptivity ΔA | Gas decomposability ΔS | Gas adsorptivity ΔA | Gas decomposability ΔS | Decomposability |
| Example 411 | 150 | 180 | 820 | 16.7 | G2 (B) | G2 (B) | A |
| Example 412 | 130 | 210 | 790 | 38.1 | G2 (B) | G1 (A) | A |
| Example 413 | 180 | 200 | 800 | 10.0 | G2 (B) | G3 (C) | A |
| Example 414 | 190 | 200 | 800 | 5.0 | G2 (B) | G3 (C) | A |
| Example 415 | 230 | 300 | 700 | 23.3 | G2 (B) | G2 (B) | A |
| Comparative Example 411 | 340 | 340 | 660 | 0.0 | G3 (C) | G4 (D) | B |
| Comparative Example 412 | 900 | 980 | 20 | 8.2 | G4 (D) | G3 (C) | C |
| Comparative Example 413 | 920 | 990 | 10 | 7.1 | G4 (D) | G3 (C) | C |
| Comparative Example 414 | 830 | 850 | 150 | 2.4 | G4 (D) | G4 (D) | B |
| Comparative Example 415 | 840 | 855 | 145 | 1.8 | G4 (D) | G4 (D) | B |
| Comparative Example 416 | 950 | 950 | 50 | 0.0 | G4 (D) | G4 (D) | C |
| Example 416 | 380 | 400 | 600 | 5.0 | G3 (C) | G3 (C) | B |
| Example 417 | 300 | 350 | 650 | 14.3 | G3 (C) | G3 (C) | B |
| Example 401 | 40 | 60 | 940 | 33.3 | G1 (A) | G1 (A) | A |
| Comparative Example 401 | 980 | 980 | 20 | 0.0 | G4 (D) | G4 (D) | B |
| Comparative Example 402 | 890 | 940 | 60 | 5.3 | G4 (D) | G3 (C) | C |
| Comparative Example 403 | 950 | 980 | 20 | 3.1 | G4 (D) | G4 (D) | B |
| Comparative Example 404 | 830 | 850 | 150 | 2.4 | G4 (D) | G4 (D) | B |
| Comparative Example 405 | 950 | 970 | 30 | 2.1 | G4 (D) | G4 (D) | C |
| Comparative Example 406 | 930 | 950 | 50 | 2.1 | G4 (D) | G4 (D) | B |
| Example 402 | 89 | 105 | 895 | 15.2 | G2 (B) | G2 (B) | A |
| Example 403 | 100 | 129 | 871 | 22.5 | G2 (B) | G2 (B) | A |
| Example 404 | 91 | 119 | 881 | 23.5 | G2 (B) | G2 (B) | B |
| Example 405 | 89 | 109 | 891 | 18.3 | G2 (B) | G2 (B) | B |
| Example 406 | 85 | 107 | 893 | 20.6 | G2 (B) | G2 (B) | A |
| Example 407 | 81 | 99 | 901 | 18.2 | G1 (A) | G2 (B) | A |
| Example 408 | 83 | 106 | 894 | 21.7 | G2 (B) | G2 (B) | A |
| Example 421 | 84 | 105 | 895 | 20.0 | G2 (B) | G2 (B) | A |
| Example 422 | 89 | 107 | 893 | 16.8 | G2 (B) | G2 (B) | A |
| Example 423 | 78 | 100 | 900 | 22.0 | G1 (A) | G2 (B) | A |
| Example 424 | 92 | 110 | 890 | 16.4 | G2 (B) | G2 (B) | A |
| Example 425 | 92 | 98 | 902 | 6.1 | G1 (A) | G3 (C) | A |
| Example 426 | 88 | 97 | 903 | 9.3 | G1 (A) | G3 (C) | A |
| Example 427 | 86 | 95 | 905 | 9.5 | G1 (A) | G3 (C) | A |
| Example 428 | 82 | 93 | 907 | 11.8 | G1 (A) | G3 (C) | A |
| Example 429 | 89 | 95 | 905 | 6.3 | G1 (A) | G3 (C) | A |
| Example 430 | 81 | 99 | 901 | 18.2 | G1 (A) | G2 (B) | A |
| Example 431 | 88 | 95 | 905 | 7.4 | G1 (A) | G3 (C) | A |
| Example 432 | 74 | 101 | 899 | 26.7 | G2 (B) | G2 (B) | A |
| Example 433 | 88 | 99 | 901 | 11.1 | G1 (A) | G3 (C) | A |
| Example 434 | 87 | 99 | 901 | 12.1 | G1 (A) | G3 (C) | A |

TABLE 14-continued

| | | | | | | | |
|---|---|---|---|---|---|---|---|
| Example 435 | 86 | 98 | 902 | 12.2 | G1 (A) | G3 (C) | A |
| Example 436 | 72 | 95 | 905 | 24.2 | G1 (A) | G2 (B) | A |

Details of a portion of the organometallic compounds indicated in Table 13 are as described below.
Acetoalkoxy aluminum diisopropylate: PLAINACT AL-M produced by Ajinomoto Co., Inc.
Isopropyl triisostearoyl titanate: PLAINACT TTS produced by Ajinomoto Co., Inc.

From the results of the performance evaluations illustrated in Tables 13 and 14, it is understood that the present examples are excellent in the photocatalytic activity in the visible light region, and are excellent in the dispersibility, as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A silica titania composite aerogel particle comprising:
    a base particle in which an element ratio Si/Ti of silicon to titanium is 2.4 or more and equal to or lower than 6, wherein:
        a BET specific surface area of the silica titania composite aerogel particle is within a range of 200 m$^2$/g to 1200 m$^2$/g, and
        the silica titania composite aerogel particle has absorption at wavelengths of 450 nm and 750 nm.
2. The silica titania composite aerogel particle according to claim 1,
    wherein the silica titania composite aerogel particle has absorption within a range of a wavelength of 400 nm to 800 nm.
3. The silica titania composite aerogel particle according to claim 1,
    wherein the silica titania composite aerogel particles have a volume average particle diameter of 0.1 μm to 3 μm, and a volume particle size distribution in a range of 1.5 to 10.
4. The silica titania composite aerogel particle according to claim 1,
    wherein the base particle is an aggregated particle in which primary particles are aggregated, and
    an average particle diameter of the primary particle is 1 nm to 90 nm.
5. The silica titania composite aerogel particle according to claim 1, comprising a first layer formed of titania on the base particle.
6. The silica titania composite aerogel particle according to claim 5, further comprising a second layer on the first layer, the second layer containing a metallic compound having a metal atom and a hydrocarbon group.
7. The silica titania composite aerogel particle according to claim 6,
    wherein the metallic compound of the second layer is bonded to the first layer via an oxygen atom.
8. The silica titania composite aerogel particle according to claim 1, further comprising a surface layer on the base particle, the surface layer containing a metallic compound having a metal atom and a hydrocarbon group.
9. The silica titania composite aerogel particle according to claim 8, wherein the metallic compound of the surface layer is bonded to the base particle via an oxygen atom.
10. The silica titania composite aerogel particle according to claim 9, wherein the hydrocarbon group of the metallic compound is directly bonded to the metal atom.
11. The silica titania composite aerogel particle according to claim 8, wherein the metal atom is a silicon atom.
12. The silica titania composite aerogel particle according to claim 8, wherein the hydrocarbon group is a saturated or unsaturated aliphatic hydrocarbon group having 1 to 20 carbon atoms, or an aromatic hydrocarbon group having 1 to 20 carbon atoms.
13. The silica titania composite aerogel particle according to claim 12, wherein the hydrocarbon group is a saturated aliphatic hydrocarbon group having 1 to 20 carbon atoms.
14. The silica titania composite aerogel particle according to claim 12, wherein the hydrocarbon group is a saturated aliphatic hydrocarbon group having 4 to 10 carbon atoms.
15. The silica titania composite aerogel particle according to claim 1, wherein the element ratio Si/Ti of silicon to titanium in the base particle is in a range of 2.4 to 4.
16. The silica titania composite aerogel particle according to claim 1,
    wherein the BET specific surface area is in a range of 300 m$^2$/g to 1100 m$^2$/g.
17. A composition for forming a photocatalyst, the composition containing the silica titania composite aerogel particle according to claim 1, and at least one compound selected from the group consisting of a dispersion medium and a binder.
18. A photocatalyst comprising the silica titania composite aerogel particle according to claim 1.

* * * * *